(12) United States Patent

Langtind et al.

(10) Patent No.: US 12,651,304 B2

(45) Date of Patent: Jun. 9, 2026

(54) PROCESSING COMMAND SUBMISSION IN GRAPHICS PROCESSORS

(71) Applicant: Arm Limited, Cambridge (GB)

(72) Inventors: Frank Klaeboe Langtind, Melhus (NO); Andreas Due Engh-Halstvedt, Trondheim (NO)

(73) Assignee: ARM Limited, Cambridge (GB)

( * ) Notice: Subject to any disclaimer, the term of this patent is extended or adjusted under 35 U.S.C. 154(b) by 132 days.

(21) Appl. No.: 18/613,269

(22) Filed: Mar. 22, 2024

(65) Prior Publication Data

US 2025/0299280 A1 Sep. 25, 2025

(51) Int. Cl.
| | |
|---|---|
| *G06T 1/20* | (2006.01) |
| *G06T 15/00* | (2011.01) |

(52) U.S. Cl.
CPC .............. *G06T 1/20* (2013.01); *G06T 15/005* (2013.01)

(58) Field of Classification Search
CPC . G06F 9/38; G06T 1/20; G06T 15/005; G06T 15/80
USPC ........................................ 345/501, 506, 522
See application file for complete search history.

(56) References Cited

U.S. PATENT DOCUMENTS

| | | | | | |
|---|---|---|---|---|---|
| 5,485,559 | A | * | 1/1996 | Sakaibara ................. | G06T 1/20 |
| | | | | | 345/522 |
| 5,706,478 | A | * | 1/1998 | Dye ......................... | G06F 9/383 |
| | | | | | 345/503 |
| 6,462,743 | B1 | * | 10/2002 | Battle ...................... | G06T 1/20 |
| | | | | | 345/506 |
| 8,736,624 | B1 | * | 5/2014 | Mahan ................... | G06T 15/005 |
| | | | | | 345/522 |
| 2007/0139421 | A1 | * | 6/2007 | Chen ......................... | G06T 1/20 |
| | | | | | 345/501 |
| 2013/0155080 | A1 | * | 6/2013 | Nordlund .............. | G06T 15/005 |
| | | | | | 345/522 |
| 2016/0078586 | A1 | | 3/2016 | Akenine-Moller | |
| 2017/0236246 | A1 | * | 8/2017 | Mrozek .................... | G06T 1/20 |
| | | | | | 345/522 |
| 2017/0287209 | A1 | | 10/2017 | Gierach et al. | |
| 2017/0345122 | A1 | | 11/2017 | Seiler et al. | |
| 2018/0158168 | A1 | * | 6/2018 | Foo ........................ | G06T 15/005 |
| 2018/0286102 | A1 | | 10/2018 | Ranganathan et al. | |

(Continued)

OTHER PUBLICATIONS

Combined Search and Examination Report under Sections 17 and 18(3), dated Nov. 19, 2024, GB Patent Application No. GB2408154.9, pp. 1-6.

*Primary Examiner* — Jacinta M Crawford

(74) *Attorney, Agent, or Firm* — Pearl Cohen Zedek Latzer Baratz LLP

(57) ABSTRACT

A command for causing a graphics processor to perform processing work for a graphics processing pipeline that the graphics processor can execute. A command to perform processing work for the graphics processing pipeline includes a first portion including a generic opcode that can be interpreted by a command processing circuit of the graphics processor to identify that the command is a command to perform processing work for the graphics processing pipeline and a second portion that is not used by command processing circuit but identifies to the graphics processing pipeline the particular processing operations to be performed. The first portion also includes information indicating a set of zero or more data values to be used for one or more processing operations for the graphics processing pipeline.

20 Claims, 13 Drawing Sheets

(56) References Cited

U.S. PATENT DOCUMENTS

| | | |
|---|---|---|
| 2021/0035257 A1 | 2/2021 | Sharma et al. |
| 2023/0094696 A1 | 3/2023 | Rodriguez et al. |
| 2023/0138635 A1 | 5/2023 | Chodor et al. |

* cited by examiner

| | Operation | Flags | | | | Pipeline Command Portion |
|---|---|---|---|---|---|---|
| | | SB Inc | SB Dec | Uses Shaders | Trace | |
| Start of Renderpass | RENDEROP | 1 | 0 | 0 | 0 | RENDERPASS_BEGIN |
| Populating Job Control Registers | MOVE r2, <data> | | | | | |
| | MOVE r3, <data> | | | | | |
| | MOVE r4, <data> | | | | | |
| | MOVE r5, <data> | | | | | |
| | MOVE r6, <data> | | | | | |
| | MOVE r7, <data> | | | | | |
| | MOVE r8, <data> | | | | | |
| Pushing State to Pipeline | RENDER_OP start_register=2, regcount=2 | 0 | 0 | 0 | 0 | GSV_SET |
| | RENDER_OP start_register=4, regcount=1 | 0 | 0 | 0 | 0 | GSV_SET |
| | RENDER_OP start_register=5, regcount=1 | 0 | 0 | 0 | 0 | GSV_SET |
| | RENDER_OP start_register=6, regcount=3 | 0 | 0 | 0 | 0 | GSV_SET |
| First Drawcall | RENDEROP | 0 | 0 | 1 | 0 | RUN_PIPELINE |
| Setting State and Running Second Drawcall | MOVE r2, <data> | | | | | |
| | MOVE r3, <data> | | | | | |
| | RENDER_OP start_register=2, regcount=1 | 0 | 0 | 0 | 0 | GSV_SET |
| | RENDER_OP start_register=3, regcount=1 | 0 | 0 | 1 | 0 | RUN_PIPELINE |
| Setting State and Running Third Drawcall | MOVE r2, <data> | | | | | |
| | RENDER_OP start_register=2, regcount=1 | 0 | 0 | 0 | 0 | GSV_SET |
| | RENDEROP | 0 | 0 | 1 | 0 | RUN_PIPELINE |
| End of Renderpass | RENDEROP | 0 | 1 | 0 | 0 | RENDERPASS_END |

FIG. 5

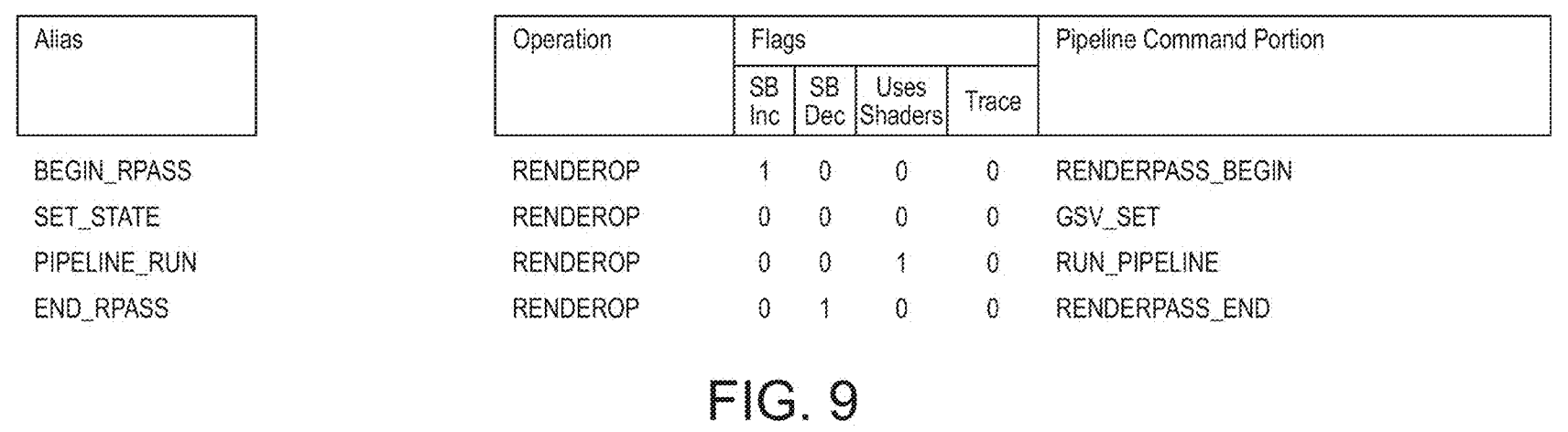

| Operation | Flags | | | | Pipeline Command Portion |
|---|---|---|---|---|---|
| | SB Inc | SB Dec | Uses Shaders | Trace | |
| RENDEROP | 1 | 0 | 0 | 0 | RENDERPASS_BEGIN |
| RENDEROP | 0 | 0 | 0 | 0 | GSV_SET |
| RENDEROP | 0 | 0 | 1 | 0 | RUN_PIPELINE |
| RENDEROP | 0 | 1 | 0 | 0 | RENDERPASS_END |

| Alias |
|---|
| BEGIN_RPASS |
| SET_STATE |
| PIPELINE_RUN |
| END_RPASS |

FIG. 9

PROCESSING COMMAND SUBMISSION IN GRAPHICS PROCESSORS

BACKGROUND

The technology described herein relates to data processing systems including graphics processors, and in particular to the submission of processing tasks from a main (e.g. host) processor of a data processing system to a graphics processor that is part of the data processing system.

Many data processing systems include processing resources, such as a graphics processor (graphics processing unit (GPU)), that may perform processing tasks for, e.g., applications that are executing on a, e.g., main (e.g. host) processor (CPU) of the data processing system.

The graphics processor may be caused to perform processing tasks for applications executing on the main (host) processor by the main (host) processor providing to the graphics processor a stream of commands (instructions) to be executed by the graphics processor. For example, a driver for the graphics processor may prepare a command set containing commands (instructions) to be performed by the graphics processor, and provide the command set to the graphics processor, with the graphics processor then performing the commands (the operations indicated by the commands) in the command set.

The commands issued to the graphics processor may, for example, contain commands to set parameters for processing tasks to be performed by the graphics processor, as well as commands to execute processing tasks using the graphics processor's available processing circuits/units.

A suitable command processing unit (e.g. a "command stream frontend"/job manager) of the graphics processor will then work its way through the commands, executing the commands, e.g. in turn.

Thus, when the graphics processor receives a command from a host processor (e.g. CPU) that is executing an application that requires graphics processing to be performed, the command processing unit (e.g. command stream frontend/job manager) of the graphics processor typically processes the command to identify the processing that is to be performed. This is done by the command processing unit (e.g. command stream frontend/job manager) of the graphics processor identifying the type of command. For example, each different type of command that is supported by a graphics processor may have a respective (unique) operation code ("opcode") that can be identified by the command processing unit (e.g. command stream frontend/job manager) of the graphics processor, and used to determine the processing that is to be performed.

The Applicants believe, however, that there remains scope for improvements to the submission of processing tasks for execution to graphics processors.

BRIEF DESCRIPTION OF THE DRAWINGS

Embodiments of the technology described herein will now be described by way of example only and with reference to the accompanying drawings, in which:

FIG. 5 shows schematically an example command set for a graphics processor according to an embodiment using the command format of FIG. 4;

FIG. 9 shows schematically features of preparing a command set for a graphics processor;

DESCRIPTION

Figure 1:
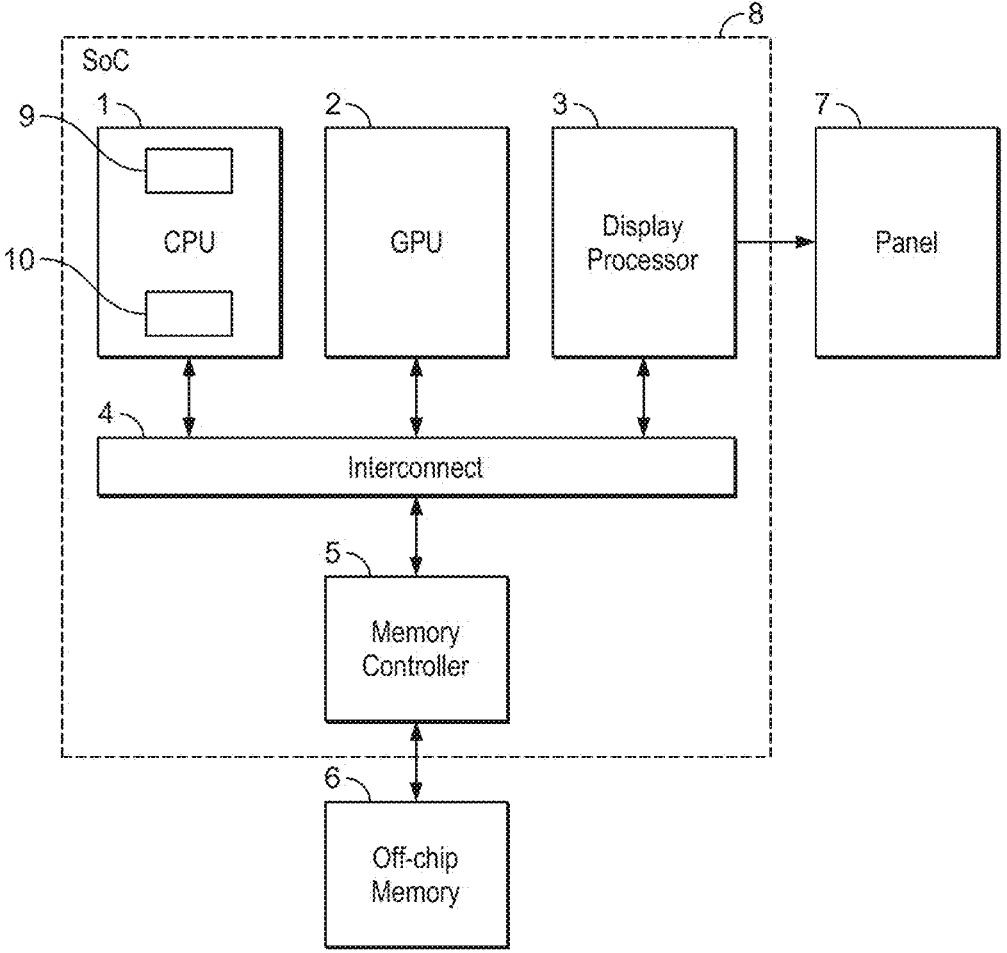
FIG. 1 shows an exemplary data processing system in which the technology described herein may be implemented.

A first embodiment of the technology described herein comprises a method of operating a data processing system that comprises:

a main (e.g. host) processor; and a graphics processor operable to perform processing work for applications executing on the host processor, wherein the graphics processor is operable and configured to perform processing work by executing a processing pipeline, and wherein the graphics processor includes a command processing circuit operable to process commands received from the main processor to perform processing work, the method comprising:

preparing on the main host processor, in response to a request from an application executing on the host processor for processing to be performed by the graphics processor, a set of commands including a command to perform processing work for the processing pipeline, which command to perform processing work for the processing pipeline comprises:

(i) a first portion including an operation code ("opcode") identifying that the command is a command to perform processing work for the processing pipeline, the first portion further including information indicating a set of zero or more data values to be used for one or more processing operations for the processing pipeline; and (ii) a second portion indicating one or more particular processing operations to be performed for the processing pipeline, the method further comprising:

the graphics processor, in response to receiving the command to perform processing work for the processing pipeline:

processing, by the command processing circuit of the graphics processor, the first portion of the command to determine that the command is a command to perform processing work for the processing pipeline;

providing (at least) the second portion of the command to the processing pipeline; and using the second portion of the command to determine one or more processing operations to perform for the processing pipeline.

A second embodiment of the technology described herein comprises a data processing system that comprises:

a main (e.g. host) processor; and a graphics processor operable to perform processing work for applications executing on the host processor, wherein the graphics processor is operable and configured to perform processing work by executing a processing pipeline, and wherein the graphics processor includes a command processing circuit operable to process commands received from the main processor to perform processing work, wherein the host processor is operable and configured to prepare, in response to requests from applications executing on the host processor for processing to be performed by the graphics processor, commands for the graphics processor, wherein a set of commands for the graphics processor can include a command to perform processing work for the processing pipeline, which command to perform processing work for the processing pipeline comprises:

(i) a first portion including an operation code ("opcode") identifying that the command is a command to perform processing work for the processing pipeline, the first portion further including information indicating a set of zero or more data values to be used for one or more processing operations for the processing pipeline; and (ii) a second portion indicating one or more particular processing operations to be performed for the processing pipeline, the command processing circuit of the graphics processor being operable and configured, in response to receiving such a command to perform processing work for the processing pipeline:

process the first portion of the command to determine that the command is a command to perform processing work for the processing pipeline;

provide (at least) the second portion of the command to the processing pipeline; and use the second portion of the command to determine one or more processing operations to perform for the processing pipeline.

The technology described herein relates to arrangements in which a graphics processor is operable to execute commands (instructions) to perform processing tasks for applications executing on a main (e.g. host) processor, the graphics processor thereby acting as a processing resource for the main (e.g. host) processor.

Thus, the main (e.g. host) processor (e.g. a CPU), in response to a request from an application executing on the host processor for processing to be performed by the graphics processor, is operable and configured to prepare one or more command set(s) for the graphics processor. The command set(s) prepared by the main (e.g. host) processor (CPU) will then be suitably processed by a respective command processing circuit (job manager/command stream frontend) of the graphics processor, which command processing circuit (job manager/command stream frontend) processes the commands included in the received command set(s) and provides the commands (or tasks derived therefrom) onto other processing circuit(s)/circuitry of the graphics processor as appropriate for performing the operations indicated by the commands.

According to the technology described herein, the graphics processor is operable, when performing processing work, to execute a processing pipeline. The operation of the processing pipeline may thus be, and in an embodiment is, triggered in this manner, i.e. by the main (e.g. host) processor (CPU) including into a command set for the graphics processor an appropriate command (or commands) to perform processing work for (i.e. relating to and/or using) the processing pipeline.

Such commands, when encountered by the command processing circuit (job manager/command stream frontend) of the graphics processor, are thus in an embodiment provided from the command processing circuit (job manager/command stream frontend) of the graphics processor into a suitable command buffer for the processing pipeline from which they can then be executed, with the corresponding (pipeline) processing operations indicated by the commands then being performed accordingly.

The technology described herein relates particularly to a novel format for such commands to control a graphics processor when performing processing work using a processing pipeline of the graphics processor.

In particular, according to the technology described herein, a command to perform processing work for the processing pipeline includes two (separate) portions, namely:

(i) a first portion including an operation code (opcode) identifying that the command is a command to perform processing work for the processing pipeline, the first portion further including information indicating a set of zero or more data values to be used for one or more processing operations for the processing pipeline; and (ii) a second portion including processing pipeline command information indicating a corresponding one or more processing operations to be performed for the processing pipeline (which processing operations are able to, and in an embodiment (and typically) will, use the set of data values indicated by the first portion of the command), (and this format of command may, when describing embodiments of the technology described herein, be referred to as a 'RENDER_OP' command).

By providing a command to perform processing work for the processing pipeline in this format, i.e. including the separate first and second portions discussed above, the command format according to the technology described herein thus allows the identification of the data values to be used for one or more processing operations for the processing pipeline (i.e. as indicated within the first portion of the command) to be separated from, and hence abstracted from, the indication of the one or more processing pipeline processing operations that are to be performed using the indicated data values. This may then provide various benefits.

For example, an effect and benefit of this command format according to the technology described herein is that the processing pipeline command information (i.e. the information that is included in the second portion of the command as to which processing operations are to be performed) is effectively made 'opaque' to the command processing circuit (job manager/command stream frontend). The second portion of the command accordingly does not need to be, and in an embodiment is not, processed by the graphics processor command processing circuit (job manager/command stream frontend) but is instead passed through the command processing circuit (job manager/command stream frontend) to the processing pipeline for processing.

Thus, when commands are provided in the format according to the technology described herein, the command processing circuit (job manager/command stream frontend) is in an embodiment operable and configured to process only the first portion of the command, i.e. to determine that the command is a command to perform processing work for the processing pipeline, and the second portion of the command can then be (and is) provided to the processing pipeline to determine the actual processing operations to be performed.

This then means that, at least from the perspective of the command processing circuit (job manager/command stream frontend), the operation code (opcode) included in the first portion of the command can be (and is) a single, same ('generic') operation code (opcode) that is used to perform multiple, different processing operations for the processing pipeline, as the operation code (opcode) included in the first portion of the command only needs to indicate to the command processing circuit (job manager/command stream frontend) that the command is a command of this format (type) and that the command should therefore be provided to the processing pipeline for further processing (with the second portion of the command then indicating the actual processing operations to be performed for the processing pipeline).

This then simplifies the processing of the commands within the command processing circuit (job manager/command stream frontend) as the host (main) processor (CPU) is operable to encode multiple different types of processing pipeline processing operations using a single (same) command format, and the command processing circuit (job manager/command stream frontend) thus only needs to process commands in that single (same) command format for any/all of the different types of processing pipeline processing operations that can be encoded in this way. This can therefore be done in a more consistent, or generic manner, for multiple different types of processing pipeline processing operations (e.g. rather than the command processing circuit (job manager/command stream frontend) having to process respective separate commands for each different type of processing pipeline processing operation that may be supported, as may be the case in some more traditional graphics processor arrangements).

As mentioned above, according to the technology described herein, the first portion of the command further includes information indicating a set of zero or more data values to be used for one or more processing operations for the processing pipeline. In an embodiment, and typically, the first portion will indicate at least one, and in an embodiment a plurality of, data values to be used for the one or more processing operations This then means that the data values to be used for the one or more processing operations for the processing pipeline can also be provided to the processing pipeline as part of the command, i.e. using the first portion of the command, but this is done independently of the processing pipeline command information included in the second portion of the command indicating the actual processing operations that are to be performed for the processing pipeline using those data values.

This may be particularly beneficial since the data values to be used, or at least the amount of data that is to be used, may need to be, and in an embodiment therefore is, made visible to the command stream processing circuit (job manager/command stream frontend) (whereas, as discussed above, it is advantageous for the processing pipeline command information to be opaque to the command processing circuit (job manager/command stream frontend)).

For example, this information may be needed by the command processing circuit (job manager/command stream frontend) for job control/tracking purposes, as will be explained further below.

Indicating the data values to be used in the first portion of the command (i.e. the portion that is visible to the command processing circuit (job manager/command stream frontend) also facilitates transferring such data values to the processing pipeline via the command processing circuit (job manager/command stream frontend). For example, as will be explained further below, the data values are in an embodiment transferred in via a set of registers associated with the command processing circuit (job manager/command stream frontend), and so it is beneficial for the command processing circuit (job manager/command stream frontend) to have visibility of these data values (even without the command processing circuit (job manager/command stream frontend) having visibility of what the data values are to be used for).

Thus, the indicating that a command is a command to perform processing work for the processing pipeline, as well as the indication of a set of data values to be used for one or more processing operations for the processing pipeline, can be (and is) done using the first portion of the command format described above, and these indications are provided independently of the indications of the particular processing operations that are to be performed for the processing pipeline using those data values.

Further, it is in an embodiment only this information included in the first portion of the command that is visible to/processed by the command processing circuit (job manager/command stream frontend) (such that the command processing circuit (job manager/command stream frontend) does not have visibility of the particular processing operations that are to be performed for the processing pipeline using the indicated data values).

Thus, once the command processing circuit (job manager/command stream frontend) has identified from the first portion of a given such command that the command is a command to perform processing for the processing pipeline, and subject to any further job control/tracking operations that the command processing circuit (job manager/command stream frontend) may desirably perform at this point, the command should then be (and therefore is) provided from the command processing circuit (job manager/command stream frontend) to the processing pipeline for further processing.

The processing pipeline is then operable to use the second portion of the command to determine the actual processing operations to be performed for the processing pipeline. That is, after its processing by the command processing circuit (job manager/command stream frontend) of the graphics processor, the second portion of the command is then provided to the processing pipeline. This is in an embodiment done by adding the command into a suitable command buffer for the processing pipeline from which it can be processed to determine the processing operations to be performed, e.g. in the normal manner for operating such a command buffer.

The processing pipeline is then operable and configured to perform the processing operations indicated by the second portion of the command accordingly. As mentioned above, these processing operations are in an embodiment (and typically) performed using the data values that are indicated by the first portion of the command and so these data values are in an embodiment also provided to, or otherwise made available to, the processing pipeline together with the (second portion of the) command at this point.

For example, in some embodiments, it may be only the second portion of the command that is provided to the processing pipeline. However, in other embodiments, the second portion of the command may be, and in an embodiment is, provided to the processing pipeline together with other information, such as information identifying the data values to be used, etc. For instance, this could be done by the command processing circuit passing the full command (i.e. including both the first and second portions of the command) to the processing pipeline.

Alternatively, and in some embodiments, the second portion of the command could be passed to the processing pipeline alongside some information indicative of, or else derived from, the first portion of the command (rather than passing the first portion of the command itself (in full)). For example, the second portion of the command could be passed to the processing pipeline alongside information indicative of the data values to be used (as indicated in the first portion) and/or information indicative relating to a set of flags contained in the first portion of the command, which information may be used by the processing pipeline. The processing pipeline would typically not however need the operation code included in the first portion identifying that the command is a command to perform processing work.

Various arrangements would be possible in this regard.

Thus, the second portion of the command in an embodiment indicates the actual processing operations to be performed for the processing pipeline, and these processing operations can then be, and in an embodiment are, performed accordingly using the data values indicated by the first portion of the command. Whereas, the first portion of the command indicates a set of data values to be used, and allows these to be transferred to the processing pipeline, but the first portion of the command does not include any information indicating the particular processing operations to be performed using those data values (other than indicating that the command generally relates to the processing pipeline).

The command format according to the technology described herein thus allows the operation of the processing pipeline within the graphics processor to be decoupled from the operation of the command processing circuit (job manager/command stream frontend) of the graphics processor.

An effect and benefit of this command format is that it may then be easier to update the processing pipeline, e.g. such that it can support new/additional processing operations, without this necessarily having any impact on the operation of the graphics processor command processing circuit (job manager/command stream frontend). For example, any new/additional processing operations that are desired to be supported by the processing pipeline can according to the technology described herein then be indicated appropriately in the second portion of the command, so that the processing pipeline can interpret these appropriately, but this will have no impact on the processing of such commands by the command processing circuit (job manager/command stream frontend) as the respective first portions of the commands can and will still be processed in the same way, i.e. independently of the particular processing operations indicated in the second portion.

The technology described herein can therefore provide various benefits compared to other possible approaches.

As mentioned above, the technology described herein relates to a particular novel format for commands to perform processing work for/using a processing pipeline. These commands can therefore be included into a set of commands for a graphics processor, as desired, to control operation of the processing pipeline of the graphics processor.

Accordingly, a given command set for a graphics processor may therefore include one or more, and typically a plurality of, such commands to perform a corresponding one or more, and in an embodiment plurality of, processing operations for the processing pipeline.

The processing operations to be performed for the processing pipeline may include any suitable and desired operations for the processing pipeline, including, for example, processing operations to set state for/configure the processing pipeline, as well as processing operations that use the processing pipeline to perform processing (i.e. processing operations to execute the processing pipeline).

For example, a command set for a graphics processor may typically include one or more such commands to initialise or configure a processing pipeline for one or more instances of processing pipeline execution, followed by one or more such commands to execute the processing pipeline.

According to the technology described herein, therefore, any and all of these such commands to perform processing operations for the processing pipeline may be encoded using a same basic command format, e.g. as described above.

Thus, from the perspective of the command processing circuit (job manager/command stream frontend), the sequence of commands relating to the processing pipeline operation may appear as a sequence of plural of the same (RENDER_OP) command. Thus, the respective second portions of these commands will then encode the different processing operations to be performed for the processing pipeline, but these second portions will be 'opaque' to the command processing circuit (job manager/command stream frontend), and so the operation of the command processing circuit (job manager/command stream frontend) can be simplified in this way.

A given command set for a graphics processor may of course contain commands of other formats, as desired (and typically will do so).

For example, the command sequence relating to the processing pipeline will in an embodiment also include a number of commands to transfer data values into a suitable set of registers associated with the command stream processing circuit (job manager/command stream frontend) (e.g. a number of (register) MOVE commands) (this will be discussed further below).

In this respect, the set of data values indicated in the first portion of the commands according to the technology described herein, is in an embodiment indicated by reference to a set of registers associated with the command stream processing circuit (job manager/command stream frontend). That is, the first portion of the command in an embodiment indicates which registers of the set of registers are to be read from by the processing pipeline (i.e. which, if any, register values are to be read from and used by the processing operations that are to be performed for the processing pipeline).

Thus, prior to the commands to configure and execute the processing pipeline, the relevant data values may be, and in an embodiment are, transferred into the respective registers, and this is in an embodiment done using suitable (e.g. (register) MOVE) commands that are processed by the command processing circuit (job manager/command stream frontend).

Various arrangements would however be possible in this respect.

For instance, the first portion of the command format described above is able to indicate zero of more data values to be used by the graphics processor when executing the processing pipeline. The first portion of the (RENDER_OP) command described above thus in an embodiment includes one or more fields dedicated for this purpose (although these fields may indicate a zero value).

In another example, however, in addition to the command format described above, there may be another type of command that is also a command to perform processing work for the processing pipeline, and which in an embodiment contains a similar second portion as the (RENDER_OP) commands described above, i.e. a second portion including processing pipeline command information indicating one or more particular processing operations to be performed for the processing pipeline, but which second portion also directly encodes zero or more data values to be used by the graphics processor when executing the processing pipeline (these other commands may be referred to herein as 'RENDER_OP_IMMEDIATE' commands).

These other (RENDER_OP_IMMEDIATE) commands may thus comprise a first portion that includes another, unique operation code (opcode) that is different to the operation code (opcode) for the (RENDER_OP) commands described above, but in contrast to the (RENDER_OP) commands described the first portions of these commands do not (and cannot) indicate any data values in their respective first portions (but the data values can instead be directly encoded into the second portions of the commands—and this may be suitable, for example, for simpler operations where less data is needed to be transferred in). Again, therefore, the processing pipeline command information can be (and is) made 'opaque' to the command processing circuit (job manager/command stream frontend), with the same benefits mentioned above, and so these (RENDER_OP_IMMEDIATE) can be used in a similar manner as the (RENDER_OP) commands described above.

These commands may therefore be particularly useful in combination with the (RENDER_OP) commands described above, as this can then provide increased flexibility as to the commands that can be used to perform processing operations for a processing pipeline, whilst still maintaining the benefits described above.

It is believed that the idea of using such commands that include a 'generic' operation code (opcode) identifying that the command is a command to perform processing work for the processing pipeline that is to be used/interpreted by the command processing circuit (job manager/command stream frontend) and then one or more operation codes (opcodes) that are specific to processing pipeline operations in a separate, second portion may be novel and advantageous in its own right.

Thus, according to further embodiments of the technology described herein, a command to perform processing work for the processing pipeline may generally comprise a first portion including an operation code (opcode) identifying that the command is a command to perform processing work for the processing pipeline; and a second portion indicating one or more particular processing operations to be performed for the processing pipeline, wherein the same operation code (opcode) is included into the first portion for a plurality of different particular processing operations to be performed for the processing pipeline (with the second portion thus in an embodiment including one or more further operation codes (opcodes) that are specific to the processing pipeline, and used/interpreted by the processing pipeline accordingly but are not used/interpreted by the command processing circuit (job manager/command stream frontend).

The commands described above are thus in an embodiment used to control the graphics processor when performing processing work for the processing pipeline, and in an embodiment any and all processing work for the processing pipeline is controlled using these commands.

The commands that are provided to the graphics processor may of course, and typically will, also include a number of other commands, as desired, e.g. to perform other processing work (i.e. processing work other than processing work for the processing pipeline). The other commands will therefore have their own respective operation codes (opcodes) that can be interpreted by the command processing circuit (job manager/command stream frontend), e.g. to perform the relevant processing operations using the appropriate processing units (circuits) of the graphics processor, as desired.

Various arrangements would of course be possible in this regard.

As described above, these commands are in an embodiment included into a command set by a main (host) processor (CPU) that is preparing one or more command set(s) for a graphics processor.

The command set(s) are then received by a suitable command processing circuit (command stream frontend/job manager) of the graphics processor, and processed thereby, e.g. as described above. The command set(s) may generally take any suitable and desired form.

The technology described herein also extends to the graphics processor and method of operating the graphics processor itself.

Thus, a further embodiment of the technology described herein comprises a method of operating a graphics processor, the graphics processor being operable and configured to perform processing work by executing a processing pipeline, and wherein the graphics processor includes a command processing circuit operable to process commands to perform processing work, the method comprising:

in response to the graphics processor receiving a command to perform processing work for the processing pipeline, which command to perform processing work for the processing pipeline includes:

(i) a first portion including an operation code ("opcode") identifying that the command is a command to perform processing work for the processing pipeline, the first portion further including information indicating a set of zero or more data values to be used for one or more processing operations for the processing pipeline; and (ii) a second portion indicating one or more particular processing operations to be performed for the processing pipeline, processing, by the command processing circuit of the graphics processor, the first portion of the command to determine that the command is a command to perform processing work for the processing pipeline;

providing (at least) the second portion of the command to the processing pipeline; and using the second portion of the command to determine one or more processing operations to perform for the processing pipeline.

A yet further embodiment of the technology described herein comprises a graphics processor, the graphics processor being operable and configured to perform processing work by executing a processing pipeline, and wherein the graphics processor includes a command processing circuit operable to process commands received from the main processor to perform processing work, the graphics processor being further operable and configured to, in response to receiving a command to perform processing work for the processing pipeline, which command to perform processing work for the processing pipeline includes:

(i) a first portion including an operation code ("opcode") identifying that the command is a command to perform processing work for the processing pipeline, the first portion further including information indicating a set of zero or more data values to be used for one or more processing operations for the processing pipeline; and (ii) a second portion indicating one or more particular processing operations to be performed for the processing pipeline, process, by the command processing circuit of the graphics processor, the first portion of the command to determine that the command is a command to perform processing work for the processing pipeline;

provide (at least) the second portion of the command to the processing pipeline; and use the second portion of the command to determine one or more processing operations to perform for the processing pipeline.

As will be appreciated by those skilled in the art, these additional embodiments of the technology described herein relating to the operation of the graphics processor itself can, and in an embodiment do, include any one or more or all of the features of the technology described herein described above, as appropriate.

Subject to the particular requirements of the technology described herein, the first and second portions of the (RENDER_OP) commands according to the technology described herein may contain any other suitable (data) fields, as desired.

For example, as mentioned above, the first portion of the command includes a respective operation code (opcode) identifying that the command is a command of this particular format.

The command processing circuit (command stream frontend/job manager) identifying the respective operation code (opcode) then triggers the particular handling of that command in the manner of the technology described herein.

The first portion of the command also includes information indicates zero or more data values to be used by the graphics processor when executing the processing pipeline. The data values may be indicated in any suitable and desired manner but this is in an embodiment done by reference to a set of registers associated with the command processing circuit (command stream frontend/job manager), as mentioned earlier.

These registers may be configured in any suitable and desired manner, e.g. in the normal manner for such registers.

Thus, the first portion of the command may indicate a particular set of registers containing data values to be used by the graphics processor when executing the processing pipeline. In an embodiment, this is an indication of a contiguous set of registers. In that case, the first portion of the command may indicate this set of registers using an indication of a starting register and a register count (i.e. the number of registers in the sequence).

The first portion of the command thus indicates, in an embodiment with respect to a set of registers associated with the command processing circuit (command stream frontend/ job manager), which data values are to be used by the processing pipeline (e.g. so that these data values can be read by/transferred into the processing pipeline as appropriate).

Various other arrangements would of course be possible in this regard.

The first portion of the command may also, and in an embodiment does, include various other control information (e.g. flags) to be used by the command processing circuit (job manager/command stream frontend).

For instance, in more traditional graphics processor operation, the command processing circuit (job manager/ command stream frontend) may perform job tracking/control based on the processing operations that are to be performed.

According to the technology described herein, however, because the processing pipeline command information indicating the processing operations to be performed for the processing pipeline is 'opaque' to the command processing circuit (job manager/command stream frontend), this means that different tracking/control mechanisms may be required.

Thus, in embodiments, one or more flags may be included into the first portion of the command that can be used by the command processing circuit (job manager/command stream frontend) to perform one or more job control/tracking operations.

For example, a respective flag may be included into the first portion of a given command that is used to indicate when a processing operation specified by the processing pipeline command information included in the second portion of that given command requires a shader program to be executed. This flag can thus be used (i.e. set) appropriately for scheduling purposes, e.g. to try to ensure that shader core(s) are available for executing those shader programs, but this is done without the command processing circuit (job manager/command stream frontend) having any explicit indication of which processing operations are to be performed, or hence which shader programs may need to be executed.

As another example, a respective flag may be included into the first portion of a given command that is used to indicate that an instruction 'trace' should be performed. If such flag is present, and set, this can therefore trigger an instruction trace operation (which instruction trace operation can then be performed in any suitable and desired manner, e.g. as normal).

Another flag may be used, for example, to indicate whether it should be signalled to the command processing circuit when the processing operations indicated in the second portion of the command have completed.

Thus, in embodiments, the first portion of the command includes additional job control information, which additional job control information is used by the command processing circuit to control scheduling of processing to the processing pipeline.

For example, such additional job control information included in the first portion of the command may include one or more flags to indicate one or more of: (i) whether the processing operations indicated in the second portion of the command require shader programs to be executed; (ii) whether an instruction trace operation should be performed; and/or (iii) whether it should be signalled to the graphics processor's overall command processing circuit (job manager/command stream frontend) when the processing operations indicated in the second portion of the command have completed.

In embodiments, the command processing circuit is further operable to track a completion status of processing jobs being performed by the processing pipeline. The first portion of the command may thus, and in an embodiment does, further include information to perform such tracking.

For example, and in particular, the command processing circuit may be (and in an embodiment is) operable to track when a particular render pass has finished. In this respect, in the context of graphics processing, it will be appreciated fragment shading should not generally be done for any draw calls within a particular render pass until the geometry processing for the entire render pass has been done. The completion status of the render pass may therefore be tracked, for example, using a suitable scoreboard or reference counter that is maintained by the command processing circuit (job manager/command stream frontend), and the first portions of the commands may correspondingly include flags to control the incrementing and/or decrementing of the scoreboard or reference counter, as needed.

Thus, when such a scoreboard is provided, a scoreboard increment flag can be used to increment a respective scoreboard entry. A corresponding scoreboard decrement flag can be used to decrement a respective scoreboard entry (although this should not generally be done until the relevant operations have completed).

For example, a scoreboard decrement flag may be suitably set within the first portion of a command that corresponds to the last processing operation to be performed for a render pass. That is, the first portion of the command may include a suitable flag to indicate that the processing operation indicated in the second portion of the command is the last processing operation to be performed for a render pass. When such command is received, with such flag set to indicate that the processing operation indicated in the second portion of the command is the last processing operation to be performed for a render pass, this can then trigger decrementing the respective scoreboard entry appropriately to signal that the render pass has finished. In an embodiment, however, this is not done until the last processing operation has finished.

That is, when the first portion of the command indicates that the processing operation indicated in the second portion of the command is the last processing operation to be performed for a render pass, after the processing pipeline has finished processing the command: this is in an embodiment signalled to the command processing circuit to indicate that the render pass is finished (i.e. the scoreboard can be decremented).

Various other examples may be possible in this regard.

It will also be appreciated that a particular command of the format according to the technology described herein may be associated with multiple underlying commands and, as discussed above, this may be 'opaque' to the command processing circuit (job manager/command stream frontend). Thus, there may be other than a one to one correspondence between commands of the format according to the technology described herein and commands that are then included into the command buffer for the processing pipeline.

Therefore, a credits-based system is in an embodiment used to avoid overfilling any command buffers. For example, in embodiments, the command processing circuit may be operable to maintain a respective "credits" counter. When the processing pipeline is first activated, the processing pipeline may thus send to the command processing circuit a number of credits corresponding to the size of the command buffer for the processing pipeline, so that the credits counter can be set accordingly. The credits counter can thus be initially set based on the size of the command buffer for the processing pipeline, but this is in an embodiment done by the processing pipeline issuing a suitable number of credits, and so is in an embodiment done without the command processing circuit needing to know the actual size of the command buffer (again, this helps further decouple the processing pipeline operation from the command processing circuit (job manager/command stream frontend) operation).

When the command processing circuit issues a command to the processing pipeline, the credits counter can thus be reduced accordingly. At some point, the credits counter may reduce to zero, at which point the command processing circuit should stall issuing new commands to the processing pipeline (as the command processing circuit has run out of credits and so based on its tracking, will determine that the command buffer for the processing pipeline is full).

The processing pipeline should therefore return credits to the command processing circuit to ensure continued throughput as commands are processed from the command buffer for the processing pipeline. To facilitate this, the processing pipeline may, and in an embodiment does, signal to the command processing circuit when it has space in its command buffer, to allow the credits counter to be increased appropriately. To reduce internal bandwidth, rather than doing this whenever a command is processed from the command buffer, this may be done, for example, periodically, or in response to a threshold number of spaces being available in the command buffer. Thus, the processing pipeline may be operable and configured to return batches of credits to the command processing circuit. Various arrangements would be possible in this regard.

Thus, in embodiments, the command processing circuit is operable to track how many commands it has issued to the processing pipeline and to stall issuing new commands to the processing pipeline when the command processing circuit determines based on its tracking that a command buffer for the processing pipeline is full. This tracking is in an embodiment performed using a credits-based system as described above.

Various arrangements would be possible in this regard.

After being processed by the command processing circuit (command stream frontend/job manager), the command can then be provided to the processing pipeline. This is in an embodiment done by adding the commands into a command buffer of the processing pipeline (e.g. so long as there is available space (i.e. there are sufficient credits to do so)). Any other information included in the first portion of the command, e.g. the data values (register contents), flags, etc., can also be provided to, or otherwise made available to, the processing pipeline at the same time, as desired.

The commands can then be processed from such command buffer, e.g. by a suitable controller for the processing pipeline, to perform the desired processing operations as indicated by the second portions of the commands.

The second portion of the command may thus, and in an embodiment does, include suitable identifiers for the particular processing operations to be performed for the processing pipeline that can be interpreted accordingly by the processing pipeline to determine the processing operations to perform.

This can be, and in an embodiment is, done using a suitable set of operation codes (opcodes) that identify the particular processing operations that can be performed for the processing pipeline (which operation codes (opcodes) thus correspond to a further set of operation codes (opcodes) that are specific to, and supported by, the processing pipeline (but which further operation codes (opcodes) therefore do not need to be, and typically are not, supported by the command stream processing circuit (command stream frontend/job manager), as discussed above)).

Thus, the processing pipeline may be, and in an embodiment is, operable to use and support a different set of operation codes (opcodes) to the set of operation codes (opcodes) that are used and supported by the command stream processing circuit (command stream frontend/job manager).

The processing operations indicated by the second portion of a given command may then, and in an embodiment will, use the data values that are indicated to be used by the corresponding first portion of that (same) command.

For example, a command set to control a graphics processor to perform processing work using a processing pipeline, may include an initial command to indicate the beginning of a new render pass.

According to the technology described herein, therefore, this initial command can be encoded as a first (RENDER_OP) command having the format of the technology described herein, with the second portion of the command indicating to the processing pipeline that this is the beginning of a new render pass.

(In this case, the first portion of the command may only needs to indicate that the operation code (opcode) for this command as there may be no data values that are to be used at this point (and so a RENDER_OP_IMMEDIATE command could also/alternatively be used for this initial command, as mentioned above)).

The initial command to indicate the beginning of a new render pass (i.e. the first (RENDER_OP) command) may thus be, and in an embodiment is, followed in the command set by a suitable set of commands to transfer the relevant data for the new render pass into the graphics processor (e.g., and in an embodiment, into a set of registers of the command processing circuit (command stream frontend/job manager), as described above) (which commands therefore may, e.g., and in an embodiment do, comprise traditional MOVE commands that can be processed by the command processing circuit (command stream frontend/job manager) in the normal manner for such MOVE commands).

Once this is done, the command set may, and in an embodiment (typically) will, include one or more further commands to set some configuration state for the processing pipeline and to transfer that configuration state into suitable local storage associated with the processing pipeline.

According to the technology described herein, therefore, these further commands can also be encoded as further (RENDER_OP) commands having the same format of the technology described herein, but with the second portion of the commands indicating to the processing pipeline that these further commands are to set some configuration state for the processing pipeline.

Once the configuration state has been set, and the relevant configuration data values loaded in to (local) storage associated with the processing pipeline, a further command can then be included to trigger execution of the processing pipeline, e.g. for an individual draw call. Again, this command can, according to the technology described herein, be encoded as another (RENDER_OP) command having the (same) format of the technology described herein, but with the second portion of the command indicating to the processing pipeline that this is a command to trigger execution of the processing pipeline.

Further commands may then be included, as desired, to set configuration state for, and trigger execution of, the processing pipeline, e.g. for further draw calls within the same render pass (with these in an embodiment all being encoded as (RENDER_OP) commands having the (same) format of the technology described herein).

Finally, a command may be included to indicate the end of the render pass, with this also in an embodiment being encoded as another (RENDER_OP) command having the (same) format of the technology described herein. A similar sequence of commands can then be included for a next render pass, and so on, as desired.

Thus, the different types of processing operations that can be encoded using a given (RENDER_OP) command according to the technology described herein, and for which an indication may be included into the second portion of the command, may, for example, include one or more of processing operations to: (i) indicate the beginning of a new render pass; (ii) set local processing pipeline configuration state; (iii) trigger execution of the processing pipeline configuration; and (iv) indicate the end of a render pass, and these are the actual processing operations that are indicated to, and performed for, the processing pipeline. However, from the perspective of the command processing circuit (job manager/command stream frontend), these different processing operations are all encoded in the same way, i.e. such that the command processing circuit (job manager/command stream frontend) sees a respective sequence of same (RENDER_OP) commands all having the (same) basic format according to the technology described herein.

Thus, in embodiments, the graphics processor may receive a sequence of commands to perform processing work for the processing pipeline, wherein multiple different ones of the commands in the sequence of commands to perform processing work using the processing pipeline include in their respective first portions a same operation code identifying that the command is a command to perform processing work using the processing pipeline, but wherein the respective second portions of the commands indicate different particular processing operations to be performed for the processing pipeline.

Various other information may be included in the second portion of the commands, as desired. For example, in general, the second portions of the commands may be used to provide any suitable and desired information to the graphics processor.

For example, even when the first portions of the commands are able to indicate data values to be used by the graphics processor when executing the processing pipeline (e.g. the command format includes appropriate fields for storing this information in the first portion), as is the case for the (RENDER_OP) commands according to the technology described herein, it may still be desirable in some cases to also be able to encode some data values directly into the second portion (e.g. as is done for the other (RENDER_OP_IMMEDIATE) commands mentioned above), and so in embodiments this may also be done.

Various arrangements would be possible in this regard.

Subject to the particular requirements of the technology described herein, the data processing system/graphics processor may be operated and configured in any suitable and desired manner.

The technology described herein can be used for all forms of output that a graphics processor and processing pipeline may be used to generate. In particular, the technology described herein may be used both for generating graphics processing outputs, such as frames for display, render to texture outputs, etc., or for general purpose (non-graphics) outputs.

As will be appreciated by those skilled in the art, the graphics processor can otherwise include and execute, and in an embodiment does include and execute, any one or one or more, and in an embodiment all, of the pipeline stages and circuits that graphics processors and (graphics) processing pipelines may (normally) include.

Thus, for example, the graphics processor may execute a graphics processing pipeline that in an embodiment includes one or more geometry pipeline stages, such as vertex shading, task shading, mesh shading, tessellation shading, etc., and execute one or more rendering stages, such as rasterisation and fragment shading stages, and/or appropriate ray tracing stages. In an embodiment the graphics processor is in the form of a tile-based graphics processor and so also includes and executes an appropriate tiling/binning stage or stages.

Correspondingly, the graphics processor may include any one or more of, and in an embodiment plural of: one or more geometry processing circuits, primitive assembly circuit or circuits, a tiling/binning circuit or circuits, a primitive setup circuit, a rasteriser circuit and a renderer circuit (in an embodiment in the form of or including a programmable fragment shader), a depth (or depth and stencil) tester, a blender, a tile buffer, a write out circuit, etc.

In an embodiment, the graphics processor comprises, and/or is in communication with a memory system, one or more memories, and/or memory devices that store the data described herein, and/or that store software for performing the processes described herein. The graphics processor may also be in communication with a host microprocessor, and/or with a display for displaying images based on the output of the graphics processor.

The output to be generated may comprise any output that can and is to be generated by the graphics processor and processing pipeline. Thus it may comprise, for example, a tile to be generated in a tile based graphics processing system, and/or a frame of output fragment data. The technology described herein can be used for all forms of output that a graphics processor and processing pipeline may be used to generate, such as frames for display, render-to-texture outputs, etc., In an embodiment, the output is an output frame, and in an embodiment an image. However, in general the graphics processors (and (graphics) processing pipelines) of the technology described herein may be used both for performing graphics processing work, such as generating frames for display, etc., or for performing general purpose (non-graphics) work, as desired.

In an embodiment, the various functions of the technology described herein are carried out on a single graphics processing platform that generates and outputs the (rendered) data that is, e.g., written to a frame buffer for a display device.

The various functions of the technology described herein can be carried out in any desired and suitable manner. For example, unless otherwise indicated, the functions of the technology described herein can be implemented in hardware or software, as desired. Thus, for example, unless otherwise indicated, the various functional elements, stages, and "means" of the technology described herein may comprise a suitable processor or processors, controller or controllers, functional units, circuitry, circuits, processing logic, microprocessor arrangements, etc., that are configured to perform the various functions, etc., such as appropriately dedicated hardware elements (processing circuits/circuitry) and/or programmable hardware elements (processing circuits/circuitry) that can be programmed to operate in the desired manner.

It should also be noted here that, as will be appreciated by those skilled in the art, the various functions, etc., of the technology described herein may be duplicated and/or carried out in parallel on a given processor. Equally, the various pipeline stages may share processing circuitry/circuits, etc., if desired.

Furthermore, unless otherwise indicated, any one or more or all of the pipeline stages of the technology described herein may be embodied as pipeline stage circuits, e.g., in the form of one or more fixed-function units (hardware) (processing circuits), and/or in the form of programmable processing circuits that can be programmed to perform the desired operation. Equally, any one or more of the pipeline stages and pipeline stage circuitry of the technology described herein may be provided as a separate circuit element to any one or more of the other pipeline stages or pipeline stage circuits, and/or any one or more or all of the pipeline stages and pipeline stage circuits may be at least partially formed of shared processing circuits.

Subject to any hardware necessary to carry out the specific functions discussed above, the graphics processor can otherwise include any one or more or all of the usual functional units, etc., that graphics processors include.

It will also be appreciated by those skilled in the art that all of the described embodiments of the technology described herein can, and, in an embodiment, do, include, as appropriate, any one or more or all of the features described herein.

The methods in accordance with the technology described herein may be implemented at least partially using software e.g. computer programs. It will thus be seen that the technology described herein may provide computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a display controller, or microprocessor system comprising a data processor causes in conjunction with said data processor said controller or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus, in a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CDROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrinkwrapped software, preloaded with a computer system, for example, on a system ROM or fixed disk, or distributed from a server or electronic bulletin board over a network, for example, the Internet or World Wide Web.

Embodiments of the technology described herein will now be described.

FIG. 1 shows an exemplary system on chip (SoC) graphics processing system 8 that comprises a host processor comprising a central processing unit (CPU) 1, a graphics processor (GPU) 2, a display processor 3, and a memory controller 5. As shown in FIG. 1, these units communicate via an interconnect 4 and have access to off-chip memory 6. In this system, the graphics processor 2 will render frames (images) to be displayed, and the display processor 3 will then provide the frames to a display panel 7 for display.

In use of this system, an application 9 such as a game, executing on one or more host processors (CPUs) 1 will, for example, require the display of frames on the display panel 7. To do this, the application will submit appropriate commands and data to a driver 10 for the graphics processor 2, e.g. that is executing on a CPU 1. The driver 10 will then generate appropriate commands and data to cause the graphics processor 2 to render appropriate frames for display and to store those frames in appropriate frame buffers, e.g. in the main memory 6. The display processor 3 will then read those frames into a buffer for the display from where they are then read out and displayed on the display panel 7 of the display.

In the present embodiment, the graphics processor 2 executes a graphics processing pipeline that processes graphics primitives, such as triangles, when generating an output, such as an image for display.

Figure 2:
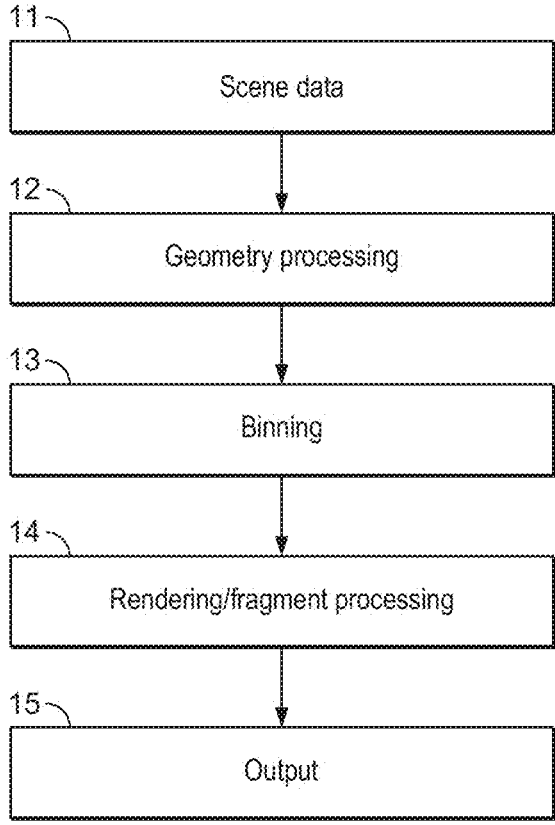
FIG. 2 shows an exemplary graphics processing pipeline.

FIG. 2 shows schematically the processing sequence of the graphics processing pipeline executed by the graphics processor 2 when generating an output in the present embodiments.

FIG. 2 shows the main elements and pipeline stages. As will be appreciated by those skilled in the art there may be other elements of the graphics processor and processing pipeline that are not illustrated in FIG. 2. It should also be noted here that FIG. 2 is only schematic, and that, for example, in practice the shown pipeline stages may share significant hardware circuits, even though they are shown schematically as separate stages in FIG. 2. It will also be appreciated that each of the stages, elements and units, etc., of the processing pipeline as shown in FIG. 2 may, unless otherwise indicated, be implemented as desired and will accordingly comprise, e.g., appropriate circuitry, circuits and/or processing logic, etc., for performing the necessary operation and functions.

As shown in FIG. 2, for an output to be generated, a set of, e.g. scene data 11, including, for example, and inter alia, a set of vertices (with each vertex having one or more attributes, such as positions, colours, etc., associated with it), a set of indices referencing the vertices in the set of vertices, and primitive configuration information indicating how the vertex indices are to be assembled into primitives for processing when generating the output, is provided to the graphics processor, for example, and in an embodiment, by storing it in the memory 6 from where it can then be read by the graphics processor 2.

This scene data may be provided by the application (and/or the driver in response to commands from the application) that requires the output to be generated, and may, for example, comprise the complete set of vertices, indices, etc., for the output in question, or, e.g., respective different sets of vertices, sets of indices, etc., e.g. for respective draw calls to be processed for the output in question. Other arrangements would, of course, be possible.

There is then a geometry pipeline stage or stages 12, which performs appropriate geometry processing of and for the scene data to generate the data that will then be required for rendering the output. This geometry processing 12 can comprise any suitable and desired geometry processing that may be performed as part of a graphics processing pipeline.

In the present embodiments, this geometry processing comprises at least performing vertex processing (vertex shading) of attributes for vertices to be used for primitives for the render output being generated. In particular, appropriate vertex position shading is performed to transform the positions for the vertices from the, e.g. "model" space in which they are initially defined, to the, e.g., "screen", space that the output is being generated in. In embodiments, the vertex shading also comprises generating and/or processing other, non-position attributes of vertices (varyings/varying shading). It would also be possible for some or all the varying shading to be deferred from the geometry processing and, for example, to be triggered at the binning or rendering stages instead, if desired.

As well as appropriate vertex shading, the geometry processing may comprise any other form of geometry processing that is desired, such as one or more of tessellation shading, transform feedback shading, mesh shading, or task shading. This geometry shading may also generate and/or process attributes for vertices, and/or it may process and generate attributes for primitives as well.

Once the desired geometry processing has been performed, there is then, in the present embodiments, as shown in FIG. 2, a binning/tiling stage 13. (It is assumed in this regard that the graphics processor 2 in the present embodiments is a tile-based graphics processor and so generates respective output tiles of an overall output (e.g. frame) to be generated separately to each other, with the set of tiles for the overall output then being appropriately combined to provide the final, overall output.)

The binning process operates to generate appropriate data structures for determining which primitives need to be processed for respective rendering tiles of the output being generated. For example, it may sort the primitives into appropriate primitive lists, which indicate the primitives to be processed for respective tiles or sets of tiles. Alternatively, it may generate other data structures, such as hierarchies of bounding boxes, that can then be used at the rendering/fragment pipeline stage to identify those primitives that need to be processed for a respective tile.

The binning/tiling process 13 may also cull primitives that are not visible (e.g. that fall outside the view frustum, and/or based on the facing direction of the primitives).

As part of the geometry processing and/or the binning/tiling operation the primitives to be processed will be "assembled". The primitives will, as discussed above, be assembled from a set of indices referencing vertices in a set of vertices for the render output processing being performed, based on primitive configuration information indicating how the vertex indices are to be assembled into primitives for processing when generating the render output.

Such primitive assembly may be performed as part of and at an appropriate stage of the geometry processing and/or as part of the binning/tiling processing, as desired. There may also, if desired, be two (or more) "primitive assembly" operations. For example, an initial primitive assembly operation could be performed to identify those vertices that will actually be used for the render output being generated before performing any vertex shading of the vertices, but with there then being a later primitive assembly stage that provides a sequence of assembled primitives for the binning/tiling stage.

Once the binning/tiling process has generated the necessary data structures for identifying the primitives to be processed for respective tiles of the render output, the primitives can then be and are then subjected to appropriate rendering/fragment processing 14. This operation is performed in the present embodiments on a tile-by-tile basis, using the data structures generated by the tiling/binning process 13 to identify those primitives that need to be processed for a respective tile.

The rendering/fragment processing can comprise any suitable and desired rendering and fragment processing operations that may be performed. Thus it may comprise, for example, first rasterising primitives to be processed for a tile to fragments, and then processing those fragments accordingly (e.g., and in an embodiment, by performing appropriate fragment shading of the fragments). The rendering/fragment processing may also or instead comprise performing ray tracing operations, such as performing the rendering by tracing rays for respective fragments representing respective sets of one or more sampling positions of the output being generated. Hybrid ray tracing operations would also be possible, if desired.

The output of the rendering/fragment processing (the rendered fragments) is written to a tile buffer (not shown). Once the processing for the tile in question has been completed, then the tile will be written to an output data array in memory 6, and the next tile processed, and so on, until the complete output data array 15 has been generated. The process will then move on to the next output data array (e.g. frame), and so on.

The output data array may typically be an image for a frame intended for display on a display device, such as a screen or printer, but may also, for example, comprise intermediate render data intended for use in later rendering passes (also known as a "render to texture" output), or for deferred rendering, or for hybrid ray tracing, etc.

Figure 3:
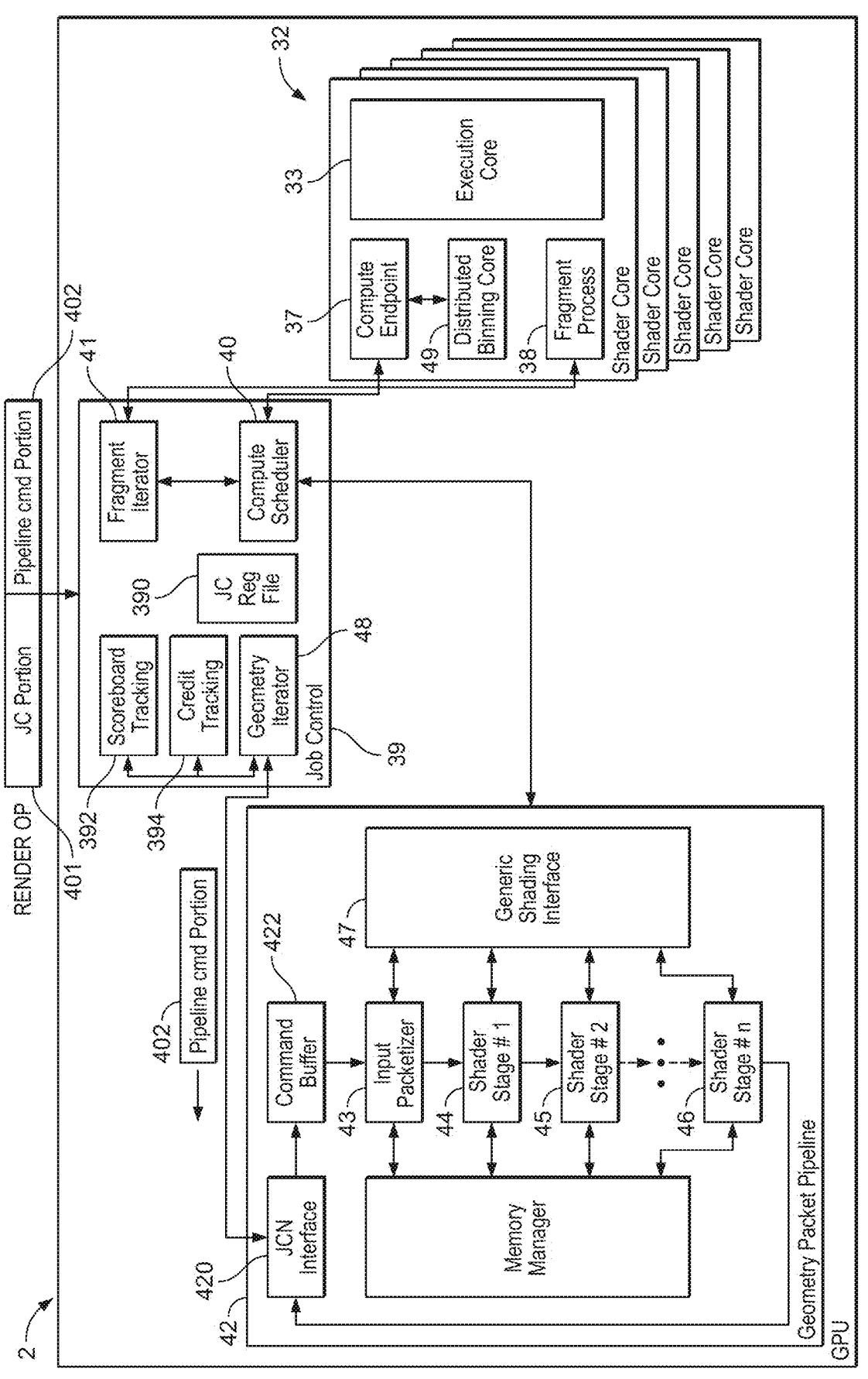
FIG. 3 shows schematically a graphics processor that may be operated in accordance with the technology described herein.

FIG. 3 shows an embodiment of a graphics processor (GPU) 2 that can execute a graphics processing pipeline of the form shown in FIG. 2, and that can be operated in the manner of the technology described herein.

As shown in FIG. 3, the graphics processor 2 comprises a plurality of processing (shader) cores 32 which are each operable to execute (shader) programs to perform processing operations. As shown in FIG. 3 each shader core 32 to facilitate this comprises a programmable execution unit (execution core) 33 that is operable to execute program instructions to perform processing operations.

Each execution core 33 has appropriate access to a memory system of the data processing system that the graphics processor 2 is part of.

In the present embodiments, the shader cores 32 are operable to execute both "compute" shader programs (to perform so-called compute shading) and fragment shader operations. Thus as shown in FIG. 3, each shader core 32 comprises an appropriate compute endpoint 37 and fragment endpoint 38 that act as the control interface for performing compute shading and fragment processing, respectively, and that will, for example, and in an embodiment, trigger the execution core 33 to execute the appropriate compute shading or fragment shading tasks, as required.

As shown in FIG. 3, the compute endpoint 37 and fragment endpoint 38 receive appropriate processing tasks from a job control unit 39 of the graphics processor 2, which job control unit 39 includes an appropriate compute scheduler 40 and fragment iterator 41 for distributing processing jobs that the job controller 39 receives as appropriate processing jobs to the shader cores 32.

As discussed above, when performing graphics processing, there will typically be an initial geometry processing pipeline stage determines the vertex and other data that is necessary for generating the graphics processing output in question, which will then be followed by a rendering/fragment pipeline for processing (rendering) that geometry.

In the present embodiments, the geometry processing is performed, as shown in FIG. 3, by a geometry packet pipeline 42 of the graphics processor 2. This geometry packet pipeline is operable to trigger the performance of one or more "geometry" shader stages (which shader stages themselves will be executed by the shader cores 32, under the control of the geometry packet pipeline 42).

For example, as shown in FIG. 3, the geometry packet pipeline 42 comprises an input packetizer 43 that can trigger position shading and vertex shading 50 by the shader cores 32. It also includes further shader stage circuits 44, 45, 46 that are operable to trigger compute shaders 5 for performing geometry processing, such as task shaders, mesh shaders, tessellation shaders, etc., (which again will be executed by the shader cores 32).

As shown in FIG. 3, the geometry packet pipeline 42 has an appropriate interface 47 to the compute scheduler 40 of the job control unit 39, via which it can control and trigger the performance of appropriate geometry shading operations by the shader cores 32.

The overall operation of the geometry packet pipeline 42 is controlled by the job control unit 39 (by a geometry iterator 48 of the job control unit 39) which distributes the appropriate geometry processing jobs and tasks to the geometry packet pipeline 42.

The graphics processor 2 of FIG. 3 is configured to perform rendering in a tile-based manner (as discussed above). To facilitate this, as shown in FIG. 3, each shader core 32 also includes a distributed binning core 49 that is operable to generate appropriate data structures for determining which primitives need to be processed for respective rendering tiles of the output being generated.

In the present embodiments, the distributed binning cores 49 generate hierarchies of bounding boxes for primitives and primitive packets (that contain primitives to be rendered) (which are then used at the rendering/fragment pipeline stage to identify those primitives that need to be processed for a respective tile).

The distributed binning cores 49 may also cull primitives that are not visible (e.g. that fall outside the view frustum, and/or based on the facing direction of the primitives).

The distributed binning cores 49 can operate in any suitable and desired manner for this purpose.

As shown in FIG. 3, the distributed binning cores 49 of the shader cores 32 may trigger vertex shading, such as varying shading, as part of their operation (e.g. where varying shading was not performed by the input packetizer as part of the input packetizer 43 operation).

In the present embodiments, the rendering/fragment processing is performed by executing appropriate fragment processing operations on a shader core 32 under the control of the fragment endpoint 38. To facilitate this, as shown in FIG. 3, the fragment endpoint 38 of each shader core is operable to trigger appropriate fragment shader operation by a shader core.

As will be appreciated from the above, in operation of the present embodiments, the geometry packet pipeline 42 that performs the geometry processing will generate appropriate geometry data, such as (transformed) vertex positions, vertex varyings, and primitive attributes (which data can be respectively considered to be corresponding data elements (e.g. positions or varyings, in the case of vertices) for corresponding work items (e.g. vertices)), which data will then be used, for example, by the binning/tiling processing and rendering/fragment processing of the later stages of the graphics processing pipeline.

In the present embodiments, the geometry packet pipeline 42 operates to generate respective geometry packets containing the data that it generates. In the present embodiments, those geometry packets are then processed by the distributed binning cores 49 to generate corresponding primitive packets, which primitive packets are then used by the fragment processing (fragment shaders).

Thus, in the present embodiments, the geometry packet pipeline 42 will generate work item packets, in the form of geometry packets, that store data elements (attributes) for work items (such as vertices and primitives), which geometry packets will then be read and used by the distributed binning cores 49. Correspondingly, the distributed binning cores 49 will generate appropriate primitive packets storing data elements (attributes) for work items, such as vertices and primitives, which primitive packets will then be read and used by the fragment processing 38.

The present embodiments relate particularly to the submission of processing tasks from the central processing unit (CPU) 1 to the graphics processor (GPU) 2.

As will be described below, this is done in the present embodiments by the central processing unit (CPU) 1 issuing suitable commands to the graphics processor (GPU) 2. Thus, referring back to FIG. 3, these commands are issued to the job control unit 39 which then processes the commands accordingly to identify the processing jobs to be performed and distribute these to the appropriate processing units of the graphics processor (GPU) 2. Thus, when a command that relates to the geometry packet pipeline 42 is received, this is first processed by the job control unit 39 to identify that the command relates to the geometry packet pipeline 42, and the geometry iterator 48 of the job control unit 39 then schedules and distributes the appropriate geometry processing jobs and tasks to the geometry packet pipeline 42 accordingly.

Figure 4:
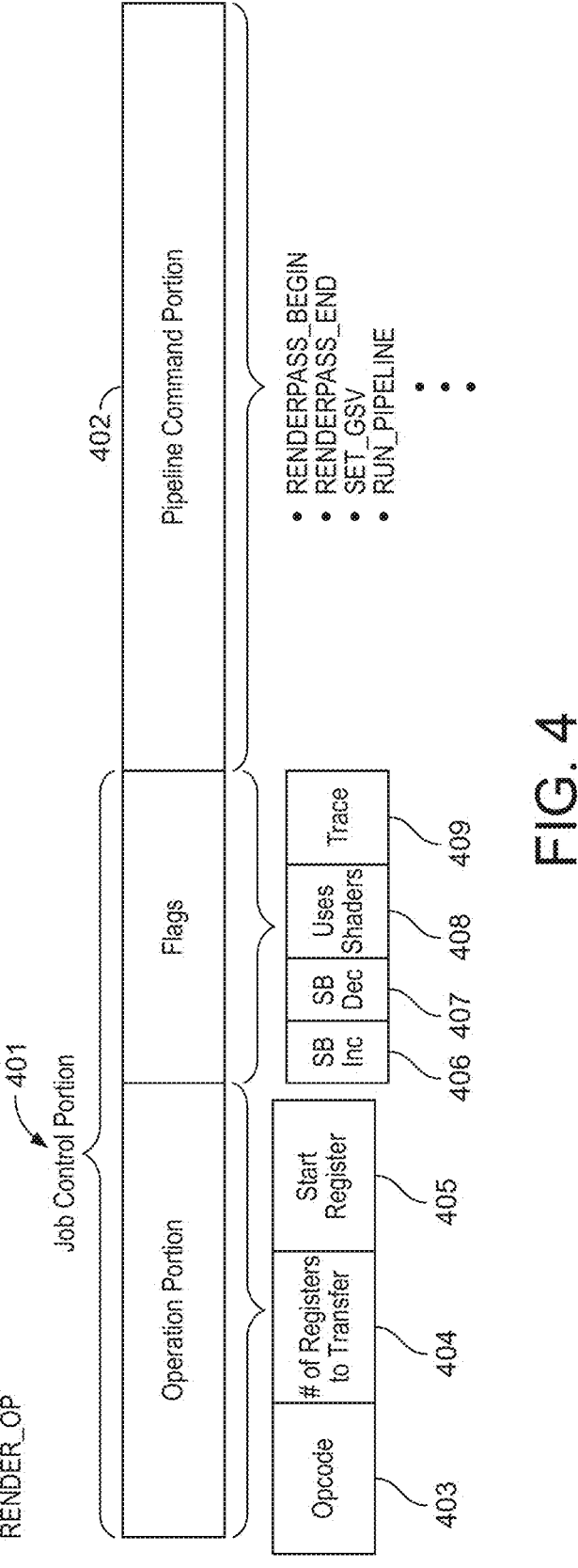
FIG. 4 shows schematically a novel command format according to an embodiment.

FIG. 4 shows an example of a novel command format for commands relating to the geometry packet pipeline 42 according to the present embodiments, which commands will be referred to herein as 'RENDER_OP' commands.

As shown in FIG. 4, the RENDER_OP command includes a 'job control' portion 401 and a 'pipeline command' portion 402. As shown in FIG. 4, and as will be explained further below, the 'job control' portion 401 and 'pipeline command' portion 402 are separate from each other and this allows the information contained within each portion to be handled separately, and processed/interpreted by different processing units, as desired.

For example, as shown in FIG. 4, the job control portion 401 includes an operation portion that includes a respective (unique) opcode 403 identifying that the command is a RENDER_OP command. The operation portion also includes information about any data values that may need to be transferred to the geometry packet pipeline 42. In particular, as shown in FIG. 4, this information is identified with reference to a contiguous set of registers 390 residing in the job control unit 39, the operation portion thus indicating a number of registers to transfer 404 and the starting register 405. The operation portion thus identifies that the command is a RENDER_OP command that should be passed to the geometry packet pipeline 42 and also identifies, with reference to appropriate registers 309, data that may need to be transferred to the geometry packet pipeline 42 (which could be zero data).

The opcode 403 identifying that the command is a RENDER_OP command can thus be processed by the job control unit 39 to identify that the command should be passed to the geometry packet pipeline 42 but does not specify any particular processing operations to be performed for the geometry packet pipeline 42 and is instead generic to a plurality of different processing operations.

As shown in FIG. 4, the specific opcodes for the processing operations to be performed for the geometry packet pipeline 42 are thus included in the pipeline command portion 402. The pipeline command portion 402 is opaque to the job control unit 39 such that the job control unit 39 does not process/use any of the information in the pipeline command portion 402. Instead, the job control unit 39 simply passes the pipeline command portion 402 to the geometry packet pipeline 42 (e.g. into a command buffer 422 for the geometry packet pipeline 42, via a suitable job control network interface 420 thereof), and the information in the pipeline command portion 402 is then processed/used by the geometry packet pipeline 42 to determine the particular processing operations to be performed.

FIG. 5 shows schematically an example command set for a graphics processor as seen by the job control unit 39 according to an embodiment.

In this example, a first command is included to indicate the beginning of a render pass (RENDERPASS_BEGIN). This is then followed by a sequence of MOVE commands to load relevant data for that render pass into respective registers 390 of the job control unit 39. A sequence of four (GSV_SET) commands are then included to transfer data from the registers 390 into local storage associated with the geometry packet pipeline 42, followed by a command to execute the geometry packet pipeline 42 for a first draw call (the RUN_PIPELINE command). This is then followed by further sequences of commands for setting state, and executing the geometry packet pipeline 42, for second and third draw calls, and a final command to indicate the end of the render pass (RENDERPASS_END).

Thus, as shown in the right hand side of FIG. 5, these RENDER_OP commands are to perform a sequence of different processing operations for the geometry packet pipeline 42. However, as shown in the left hand side of FIG. 5, the job control unit 39 sees only a sequence of RENDER_OP commands (as well as various MOVE commands to transfer data between registers 390), and so from the perspective of the job control unit 39, these commands can all be (and are) treated in the same manner.

The job control unit 39 thus doesn't need to support separate operations for each of the different processing operations, e.g. to determine whether those operations use shaders, etc., as the specific processing operations are abstracted from the job control unit 39. This however means that the RENDER_OP command may need to directly indicate such information to the job control unit 39. To facilitate this, as shown in FIG. 4, the operation portion also contains a number of flags that can be used by the job control unit 39 to perform its various job tracking/scheduling operations.

For example, as shown in FIG. 4, a 'uses_shader' flag 408 may be set to indicate whether or not the processing operations indicated in the pipeline command portion 402 will run a shader program. This information can then be used by the job control unit 39 for scheduling purposes, for example to avoid allocating computer jobs that may prevent the desired shader programs running.

Similarly, a 'trace' flag 409 may be set to indicate to the job control unit 39 whether or not an instruction trace should be performed.

In the present embodiments, respective 'scoreboard_increment' 406 and 'scoreboard_decrement' 407 flags are also included. These flags can then be used to increment/decrement a scoreboard 392 that is managed by the job control unit 39 in order to track the completion status of processing jobs (e.g. for a render pass). For instance, fragment shading should not generally be run on any draw calls until the geometry processing is finished for the entire render pass, and this can in the present embodiments be tracked using the scoreboard 392. However, again, because the job control unit 39 does not have sight of the actual underlying processing operations indicated in the command pipeline portion 402 of for the RENDER_OP commands, the job control unit 39 cannot see when the RENDERPASS_END command is issued. Therefore, this is communicated to the job control unit 39 using the scoreboard 392.

The scoreboard 392 can thus be (and is) incremented whenever the job control unit 39 sees a RENDER_OP command for which the scoreboard_increment flag is 406 set.

On the other hand, when a RENDER_OP command for which the scoreboard_decrement flag is 407 is set, the job control unit 39 should not (and does not) decrement the scoreboard 392 immediately, but instead waits until that operation has been processed by the final stage of the geometry packet pipeline 42, at which point the job control unit 39 is notified of this, and the scoreboard 392 is decremented accordingly.

Figure 6A:
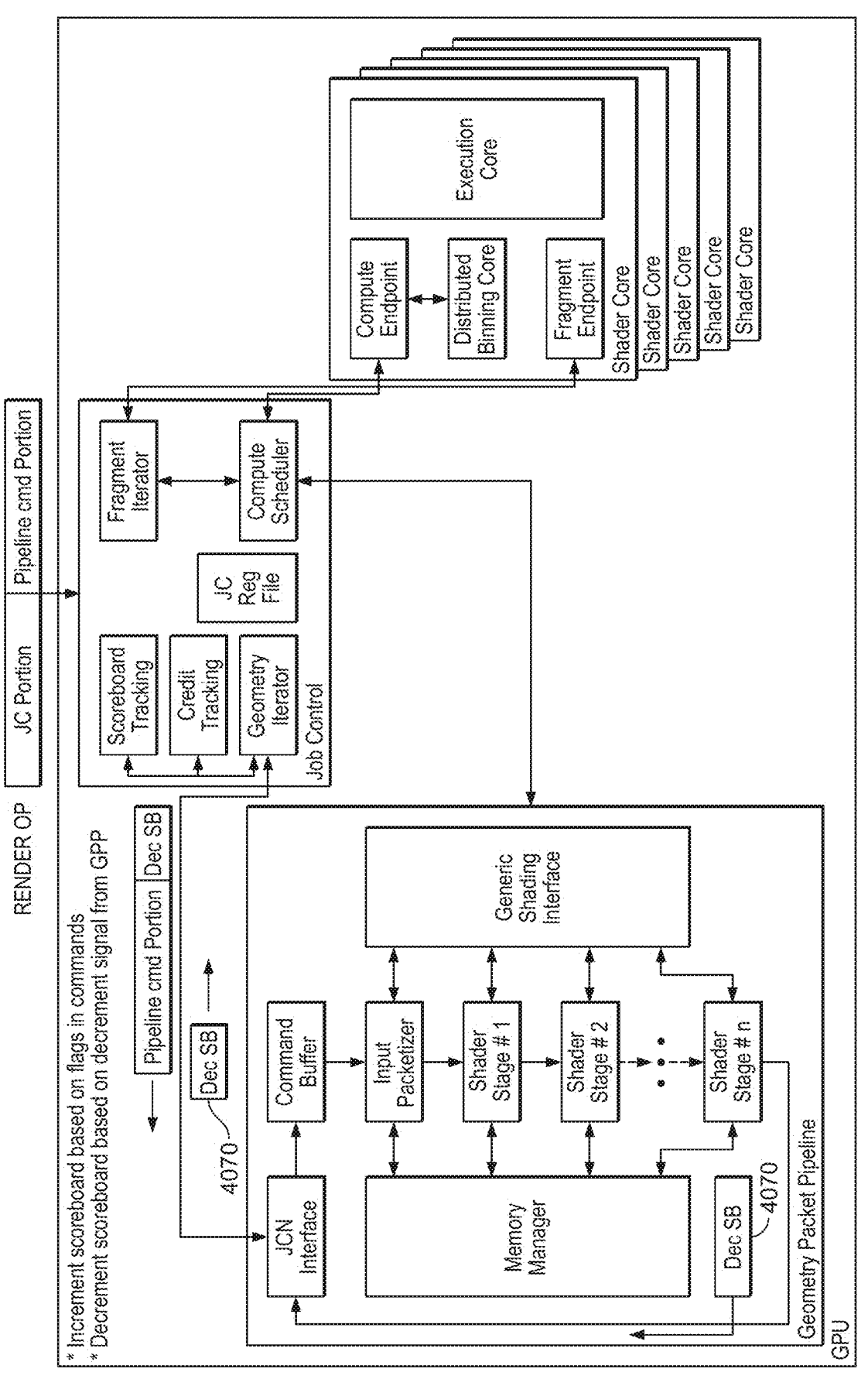
FIG. 6A and FIG. 6B shows schematically a scoreboarding operation that may be used according to embodiments.
Figure 6B:
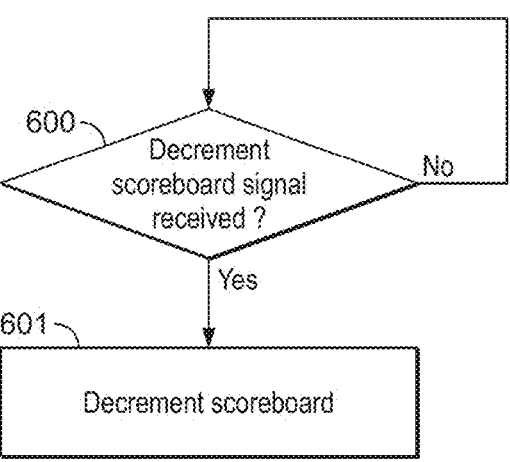

This is depicted in FIG. 6A which shows a scoreboard decrement signal 4070 being passed from the last shader stage 46 back to the job control unit 39. FIG. 6B is a flow chart showing this operation. Thus, as shown in FIG. 6B, in response to receiving a scoreboard decrement signal 4070 (step 600—yes), the job control unit 39 is operable to decrement its scoreboard 392 (step 601).

Another effect of abstracting the processing operations from the commands in the manner described above is that the job control unit 39 may see only a single RENDER_OP command, but this single RENDER_OP command may cause multiple commands to be added into the command buffer 422 for the geometry packet pipeline 42. For example, as mentioned above, the job control portion 401 of a RENDER_OP command may indicate (using a respective flag 404) a number of registers to transfer to the geometry packet pipeline 42. So, a RENDER_OP command that instructs the job control unit 39 to transfer four registers to the geometry packet pipeline 42, there are effectively then five commands that will be sent to the geometry packet pipeline 42 (i.e. the actual command in the command set for the geometry packet pipeline 42 indicated within the respective command pipeline portion 402 of the RENDER_OP command, as well as four 'data' commands).

There is a risk therefore that the job control unit 39 may issue what it sees as a single RENDER_OP command to the geometry packet pipeline 42, but this single RENDER_OP command causes multiple commands to be added into the command buffer 422 for the geometry packet pipeline 42, which may result in overfilling of the command buffer 422 if this is not appropriate managed. To avoid this, a credit scheme is in an embodiment used to avoid overfilling the command buffer 422.

Thus, when the geometry packet pipeline 42 is activated (or, e.g., re-activated, e.g. after it has previously been suspended), the geometry packet pipeline 42 issues to the job control unit 39 a I number of credits equal to the number of spaces for commands in its command buffer 422 and the credits counter 394 is updated accordingly to include a corresponding number of credits. As the job control unit 39 issues commands/data to the geometry packet pipeline 42, the job control unit 39 decrements its version of the credit counter 394 appropriately (and when the credit counter 394 maintained by the job control unit 39 reaches zero, the job control unit 39 stops sending commands (as from the perspective of the tracking performed by the job control unit 39, the job control unit 39 will determine that the command buffer 422 must be full at that point)).

The command buffer 422 of the geometry packet pipeline 42 should therefore, and does, send credits back to the job control unit 39 as commands are drained from the command buffer 422. However, rather than sending back individual credits, the command buffer 422 in an embodiment batches up the credits to be returned and returns a batch at a time. For example, this could be done once a certain threshold number of credits are available, or, for example, periodically. Various arrangements would be possible in this regard.

Figure 7A:
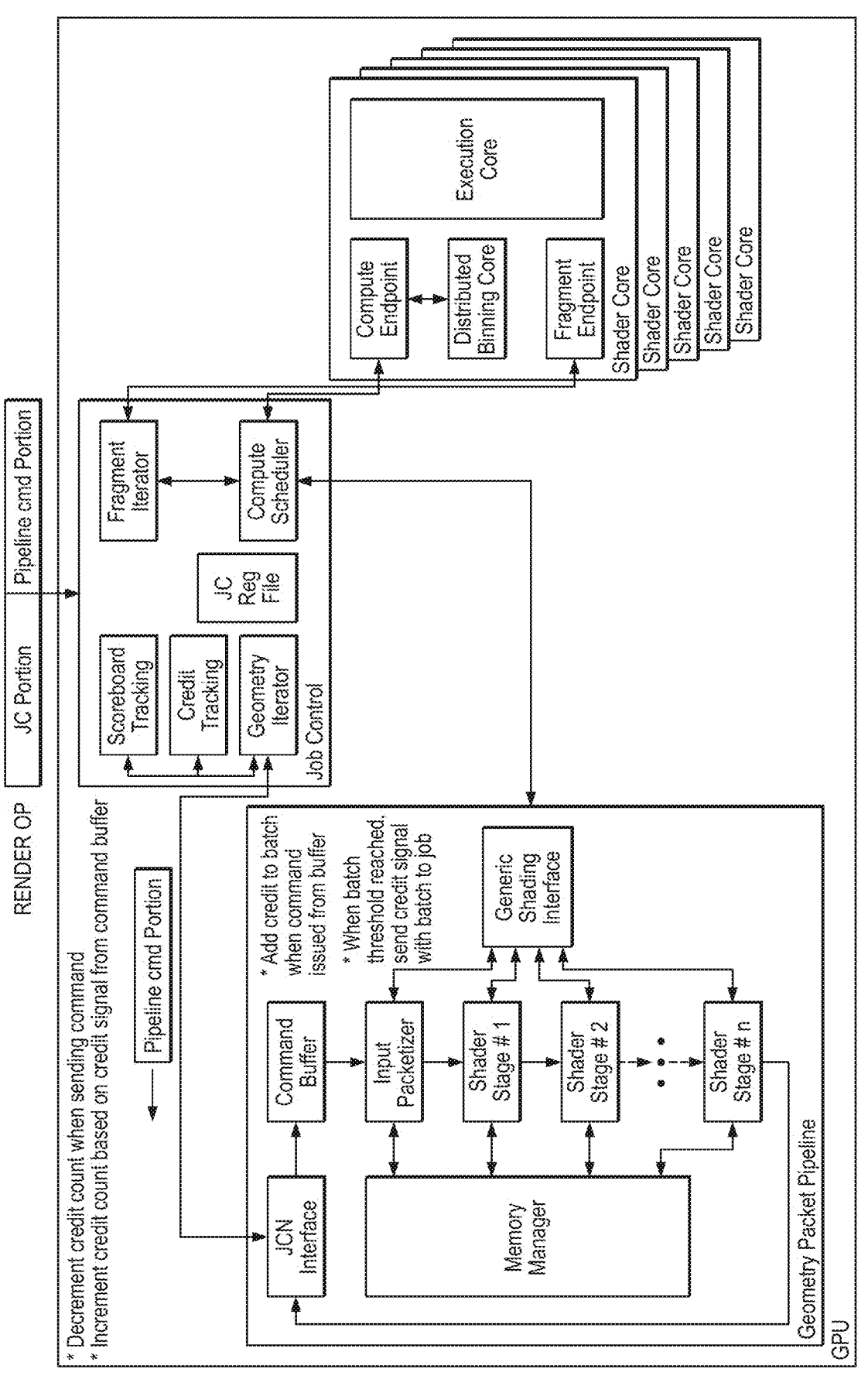
FIG. 7A and FIG. 7B shows schematically a credit system that may be used according to embodiments.
Figure 7B:
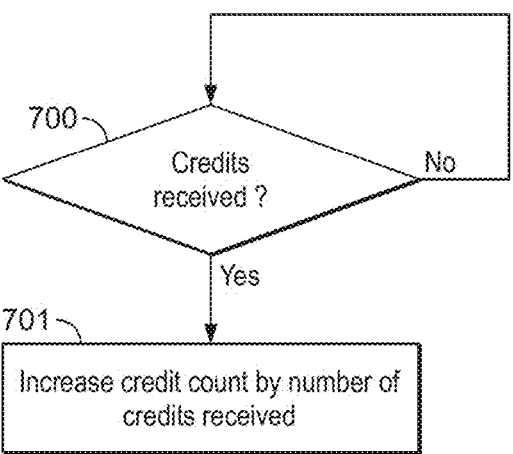

This credit scheme is depicted in FIG. 7A and FIG. 7B. For instance, as shown in FIG. 7B, in response to the job control unit 39 receiving a batch of credits from the geometry packet pipeline 42 (step 700—yes), the credit counter 394 is incremented by a corresponding amount. Otherwise, if the credit counter 394 reaches zero, the job control unit 39 must pause issuing commands to the geometry packet pipeline 42 until further credits are received.

Figure 8:
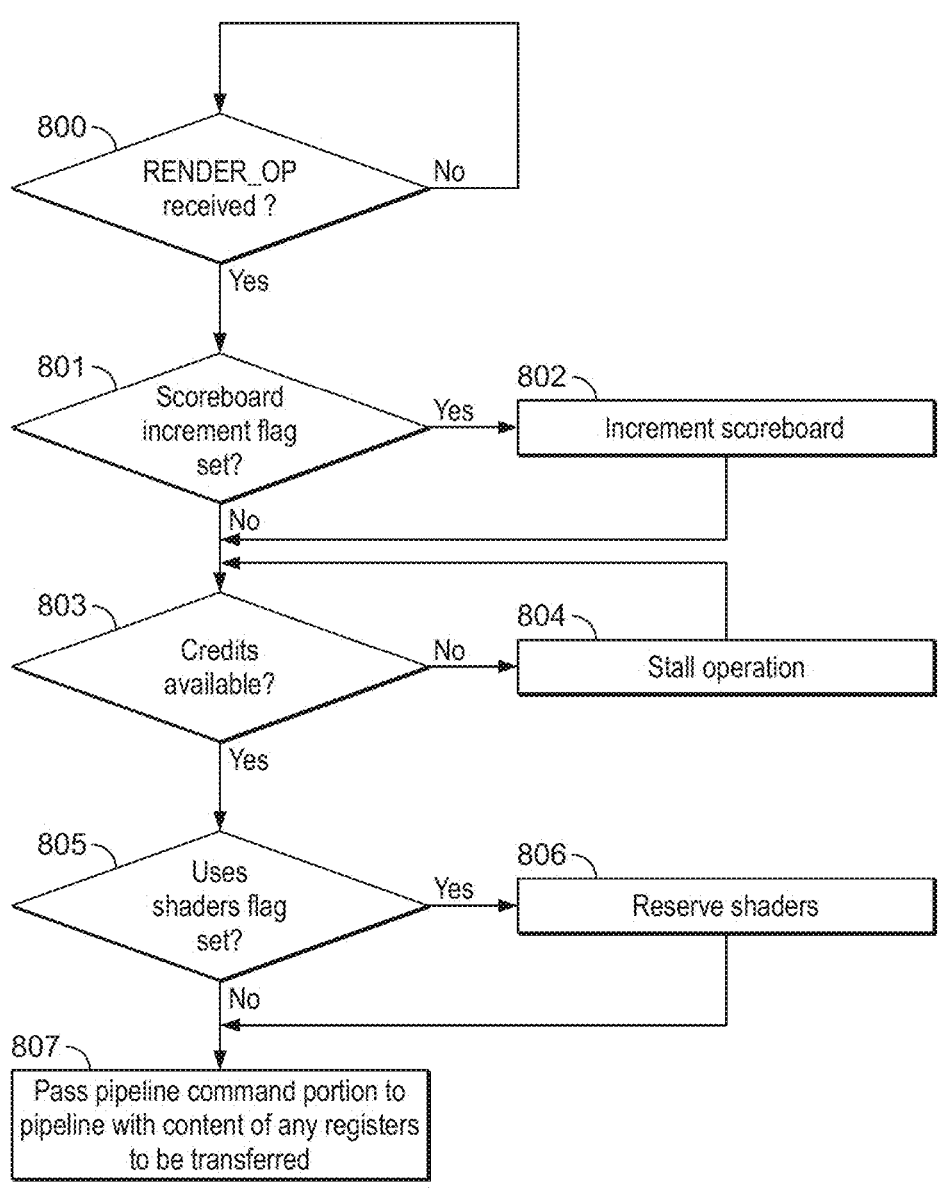
FIG. 8 is a flow chart illustrating the processing of commands according to the command format of FIG. 4.

FIG. 8 is a flow chart illustrating the overall processing of a RENDER OP command by the job control unit 39.

Thus, in response to the job control unit 39 receiving a RENDER OP command (step 800—yes), it is checked whether the scoreboard_increment flag 406 is set, and if so (step 801—yes), the scoreboard 392 is incremented (step 802).

If the job control unit 39 does not have sufficient credits available (step 803—no), the job control unit 39 stalls until suitable credits have been returned.

So long as the job control unit 39 has sufficient credits available (step 803—yes), it is then checked whether the uses_shaders flag 408 is set. If so (step 805—yes), appropriate shader slots are reserved (step 806).

Once these checks have been done, the pipeline command portion 402 of the RENDER OP command is then issued to the geometry packet pipeline 42, together with an indication of any registers and/or flags that are to be used/transferred to the geometry packet pipeline 42 (step 807).

Various other arrangements would be possible.

Thus, it will be appreciated from the above that the RENDER_OP command advantageously allows the actual pipeline command information, and hence the operation of the geometry packet pipeline 42, to be decoupled from the operation of the job control unit 39, as a single (same) RENDER_OP command format can be used to encode multiple different pipeline commands.

FIG. 9 illustrates in this regard the corresponding preparing of a suitable command set by the central processing unit (CPU) 1 for submission to the graphics processor (GPU) 2. As shown in FIG. 9, aliases may be used so that the software can add in the different operations (as shown on the left hand side of FIG. 9). When preparing a set of commands for output though, these operations are all output as the same RENDER OP commands, with the compiler populating the respective pipeline command portions 402 and flags appropriately for the different operations to be performed.

As described above, the operation portion of the RENDER_OP commands according to the present embodiments include various flags and information indicate of registers to be transferred. In some cases, it may be possible and desirable to directly transfer data to the geometry packet pipeline 42 using the pipeline command portion 402. This could be done by setting the relevant state/flags in the operation portion of a RENDER_OP command to a zero/default value. In embodiments, though, another command format is available for use in such cases, as shown in FIG. 10, that will be referred to herein as a RENDER_OP_IMMEDIATE command.

Figure 10:
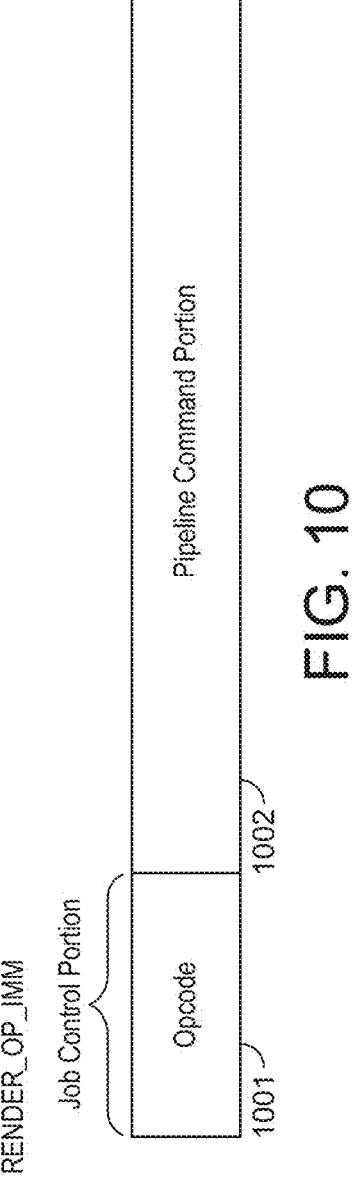
FIG. 10 shows schematically another novel command format that may be used according to embodiments.

As shown in FIG. 10, the job control portion 1001 of the RENDER_OP_IMMEDIATE command contains only the opcode identifying that the command is a RENDER_OP_IMMEDIATE command. Any other information including the actual processing operations to be performed for the geometry packet pipeline 42, as well as any data values to be directly transferred for use when performing those operations, is included in the pipeline command portion 1002 and is thus opaque to the job control unit 39.

Figure 11:
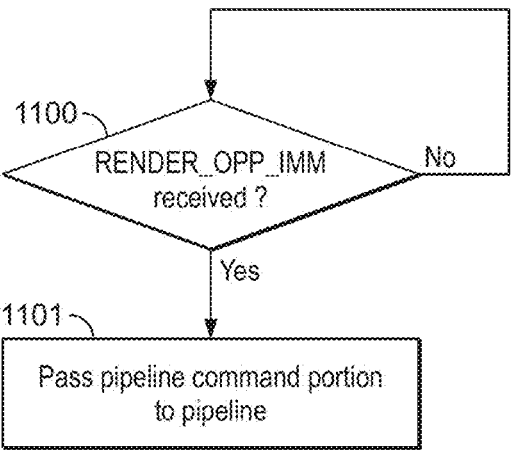
FIG. 11 is a flow chart illustrating the processing of commands according to the command format of FIG. 10.

FIG. 11 is a flow chart showing the corresponding processing of such RENDER_OP_IMMEDIATE commands within the job control unit 39. Thus, as shown in FIG. 11, in response to the job control unit 39 receiving a RENDER_OP_IMMEDIATE command (step 1100—yes), the pipeline command portion 1002 of the RENDER_OP_IMMEDIATE command is immediately passed to the geometry packet pipeline 42 (step 1101), i.e. without further processing by the job control unit 39.

Various arrangements would be possible in this regard.

The technology described herein, at least in embodiments, thus provides a novel command format for a graphics processor for performing processing for a graphics processing pipeline.

The foregoing detailed description has been presented for the purposes of illustration and description. It is not intended to be exhaustive or to limit the technology described herein to the precise form disclosed. Many modifications and variations are possible in the light of the above teaching. The described embodiments were chosen in order to best explain the principles of the technology described herein and its practical applications, to thereby enable others skilled in the art to best utilise the technology described herein, in various embodiments and with various modifications as are suited to the particular use contemplated. It is intended that the scope be defined by the claims appended hereto.

The invention claimed is:

1. A method of operating a graphics processor, the graphics processor being operable and configured to execute a processing pipeline, and wherein the graphics processor includes a command processing circuit operable to process commands received from a main processor to perform processing work, the method comprising:

in response to the graphics processor receiving a command to perform processing work for the processing pipeline, wherein the command to perform processing work for the processing pipeline includes:

(i) a first portion including an operation code identifying that the command is a command to perform processing work for the processing pipeline, the first portion further including information indicating a set of zero or more data values to be used for one or more processing operations for the processing pipeline; and (ii) a second portion indicating the one or more processing operations to be performed for the processing pipeline:

processing, by the command stream processing circuit of the graphics processor, the first portion of the command to determine that the command is a command to perform processing work for the processing pipeline;

providing the second portion of the command to the processing pipeline by adding at least the second portion of the command into a command buffer for the processing pipeline; and when executing from the command buffer for the processing pipeline, using the second portion of the command to determine the one or more processing operations to perform for the processing pipeline.

2. The method of claim 1, wherein the second portion of the command is provided to the processing pipeline together with at least an indication of any data values that are indicated by the first portion of the command to be used for the one or more processing operations indicated by the second portion of the command.

3. The method of claim 1, wherein the first portion of the command includes additional job control information, the command processing circuit using the additional job control information included in the first portion of the command to control scheduling of processing to the processing pipeline.

4. The method of claim 3, wherein the additional job control information included in the first portion of the command includes one or more flags to indicate one or more of: (i) whether the processing operations indicated in the second portion of the command require shader programs to be executed; (ii) whether an instruction trace operation should be performed; and/or (iii) whether it should be signalled to the command processing circuit when the processing operations indicated in the second portion of the command have completed.

5. The method of claim 1, wherein the command processing circuit is operable to track a completion status of processing jobs being performed by the processing pipeline, and wherein the first portion of the command further includes information to perform such tracking.

6. The method of claim 5, wherein the command processing circuit is operable to track when a render pass is finished, and wherein the first portion of the command can indicate that the processing operation indicated in the second portion of the command is the last processing operation to be performed for a render pass.

7. The method of claim 6, wherein when the first portion of the command indicates that the processing operation indicated in the second portion of the command is the last processing operation to be performed for a render pass, the method comprises: after the processing pipeline has finished processing the command: signalling this to the command processing circuit to indicate that the render pass is finished.

8. The method of claim 1, wherein the command processing circuit is operable to track how many commands it has issued to the processing pipeline and to stall issuing new commands to the processing pipeline when the command processing circuit determines based on its tracking of how many commands it has issued to the processing pipeline that the command buffer for the processing pipeline is full.

9. The method of claim 1, wherein the one or more processing operations to be performed for the processing pipeline indicated in the second portion of the command include one or more of processing operations to: (i) indicate the beginning of a new render pass; (ii) set local processing pipeline configuration state; (iii) trigger execution of the processing pipeline configuration; and (iv) indicate the end of a render pass.

10. The method of claim 1, comprising the graphics processor receiving a sequence of commands to perform processing work for the processing pipeline, wherein multiple different ones of the commands in the sequence of commands to perform processing work using the processing pipeline include in their respective first portions a same operation code identifying that the command is a command to perform processing work using the processing pipeline, but wherein the respective second portions of the commands indicate different particular processing operations to be performed for the processing pipeline.

11. A method of operating a data processing system that comprises:

a main processor; and a graphics processor operable to perform processing work for applications executing on the main processor, wherein the graphics processor is operable and configured to execute a processing pipeline, and wherein the graphics processor includes a command processing circuit operable to process commands received from the main processor to perform processing work, the method comprising:

preparing on the main processor, in response to a request from an application executing on the main processor for processing to be performed by the graphics processor, a set of commands including a command to perform processing work for the processing pipeline, wherein the command to perform processing work for the processing pipeline comprises:

(i) a first portion including an operation code identifying that the command is a command to perform processing work for the processing pipeline, the first portion further including information indicating a set of zero or more data values to be used for one or more processing operations for the processing pipeline; and (ii) a second portion indicating the one or more processing operations to be performed for the processing pipeline, the method further comprising:

the graphics processor, in response to receiving the command to perform processing work for the processing pipeline:

processing, by the command processing circuit of the graphics processor, the first portion of the command to determine that the command is a command to perform processing work for the processing pipeline;

providing the second portion of the command to the processing pipeline by adding at least the second portion of the command to a command buffer for the processing pipeline; and when executing from the command buffer for the processing pipeline, using the second portion of the command to determine the one or more processing operations to perform for the processing pipeline.

12. A graphics processor, the graphics processor being operable and configured to execute a processing pipeline, and wherein the graphics processor includes a command processing circuit operable to process commands received from a main processor to perform processing work, the graphics processor being further operable and configured to, in response to receiving a command to perform processing work for the processing pipeline, wherein the command to perform processing work for the processing pipeline includes:

(i) a first portion including an operation code identifying that the command is a command to perform processing work for the processing pipeline, the first portion further including information indicating a set of zero or more data values to be used for one or more processing operations for the processing pipeline; and (ii) a second portion indicating the one or more processing operations to be performed for the processing pipeline, process, by the command processing circuit of the graphics processor, the first portion of the command to determine that the command is a command to perform processing work for the processing pipeline;

provide the second portion of the command to the processing pipeline by adding at least the second portion of the command to a command buffer for the processing pipeline; and when executing from the command buffer for the processing pipeline, use the second portion of the command to determine the one or more processing operations to perform for the processing pipeline.

13. The graphics processor of claim 12, wherein the second portion of the command is provided to the processing pipeline together with at least an indication of any data values that are indicated by the first portion of the command to be used for the one or more processing operations indicated by the second portion of the command.

14. The graphics processor of claim 12, wherein the first portion of the command includes additional job control information, the command processing circuit operable and configured to use the additional job control information included in the first portion of the command to control scheduling of processing to the processing pipeline.

15. The graphics processor of claim 14, wherein the additional job control information included in the first portion of the command includes one or more flags to indicate one or more of: (i) whether the processing operations indicated in the second portion of the command require shader programs to be executed; (ii) whether an instruction trace operation should be performed; and/or (iii) whether it should be signalled to the command processing circuit when the processing operations indicated in the second portion of the command have completed.

16. The graphics processor of claim 12, wherein the command processing circuit is operable to track a completion status of processing jobs being performed by the processing pipeline, and wherein the first portion of the command further includes information to perform such tracking.

17. The graphics processor of claim 16, wherein the command processing circuit is operable to track when a render pass is finished, and wherein the first portion of the command can indicate that the processing operation indicated in the second portion of the command is the last processing operation to be performed for a render pass.

18. The method of claim 17, wherein when the first portion of the command indicates that the processing operation indicated in the second portion of the command is the last processing operation to be performed for a render pass, after the processing pipeline has finished processing the command, the processing pipeline is operable and configured to signal to the command processing circuit to indicate that the render pass is finished.

19. The graphics processor of claim 12, wherein the command processing circuit is operable to track how many commands it has issued to the processing pipeline and to stall issuing new commands to the processing pipeline when the command processing circuit determines based on its tracking how many commands it has issued to the processing pipeline that the command buffer for the processing pipeline is full.

20. The graphics processor of claim 12, wherein the one or more processing operations to be performed for the processing pipeline indicated in the second portion of the command include one or more of processing operations to: (i) indicate the beginning of a new render pass; (ii) set local processing pipeline configuration state; (iii) trigger execution of the processing pipeline configuration; and (iv) indicate the end of a render pass.

\* \* \* \* \*